United States Patent
Nara et al.

[11] Patent Number: 5,715,247
[45] Date of Patent: Feb. 3, 1998

[54] METHOD OF SENDING AND RECEIVING SETTING INFORMATION AND MONITORING INFORMATION IN COMMUNICATION APPARATUS

[75] Inventors: Hiroichi Nara; Jinichi Yoshizawa, both of Kawasaki, Japan

[73] Assignee: NEC Corporation, Tokyo, Japan

[21] Appl. No.: 617,318

[22] Filed: Mar. 18, 1996

[30] Foreign Application Priority Data

Aug. 1, 1995 [JP] Japan .................. 7-196284

[51] Int. Cl.$^6$ .................. H04L 12/52; H04L 12/56
[52] U.S. Cl. .................. 370/360; 370/375; 370/380; 370/399; 370/422
[58] Field of Search .................. 370/250, 357, 370/360, 375, 380, 389, 395, 398, 399, 422, 423

[56] References Cited

U.S. PATENT DOCUMENTS

| | | | |
|---|---|---|---|
| 4,327,436 | 4/1982 | Ohara et al. | 370/381 |
| 5,101,404 | 3/1992 | Kunimoto et al. | 370/398 |
| 5,144,297 | 9/1992 | Ohara | 370/360 |
| 5,303,236 | 4/1994 | Kunimoto et al. | 370/398 |

*Primary Examiner*—Alpus H. Hsu
*Attorney, Agent, or Firm*—Helfgott & Karas, P.C.

[57] ABSTRACT

Disclosed is a method of sending and receiving setting information and monitoring information between a monitoring controller and units which construct the multiplexing section of a communication apparatus. In a case where setting information is transferred from the monitoring controller to a prescribed unit, the monitoring controller time-division multiplexes the setting information for the unit and enters the information into a time switch via an incoming line. The time switch switches the time slot position of the setting information and sends the setting information to an outgoing line corresponding to the unit. The unit drops the setting information from the time slot. Further, in a case where monitoring information is transferred from a unit to the monitoring controller, the unit time-division multiplexes the monitoring information to a predetermined time slot and enters the monitoring information into the time switch from a prescribed line. The time switch switches the time slot position of the monitoring information and sends the monitoring information to the monitoring controller via an outgoing line. The monitoring controller accepts the monitoring information from the unit, with the information coming from the above-mentioned time slot.

5 Claims, 15 Drawing Sheets

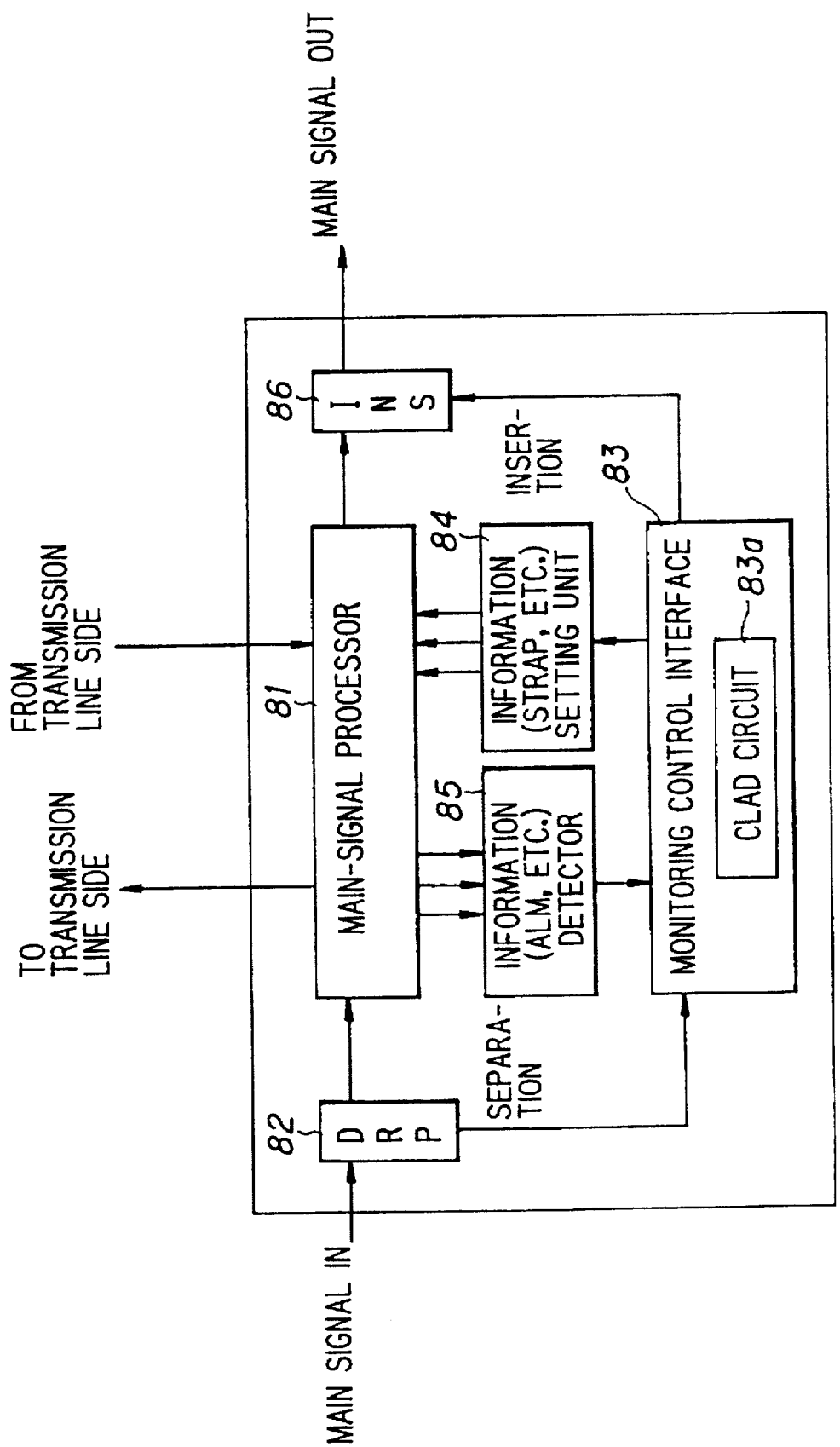

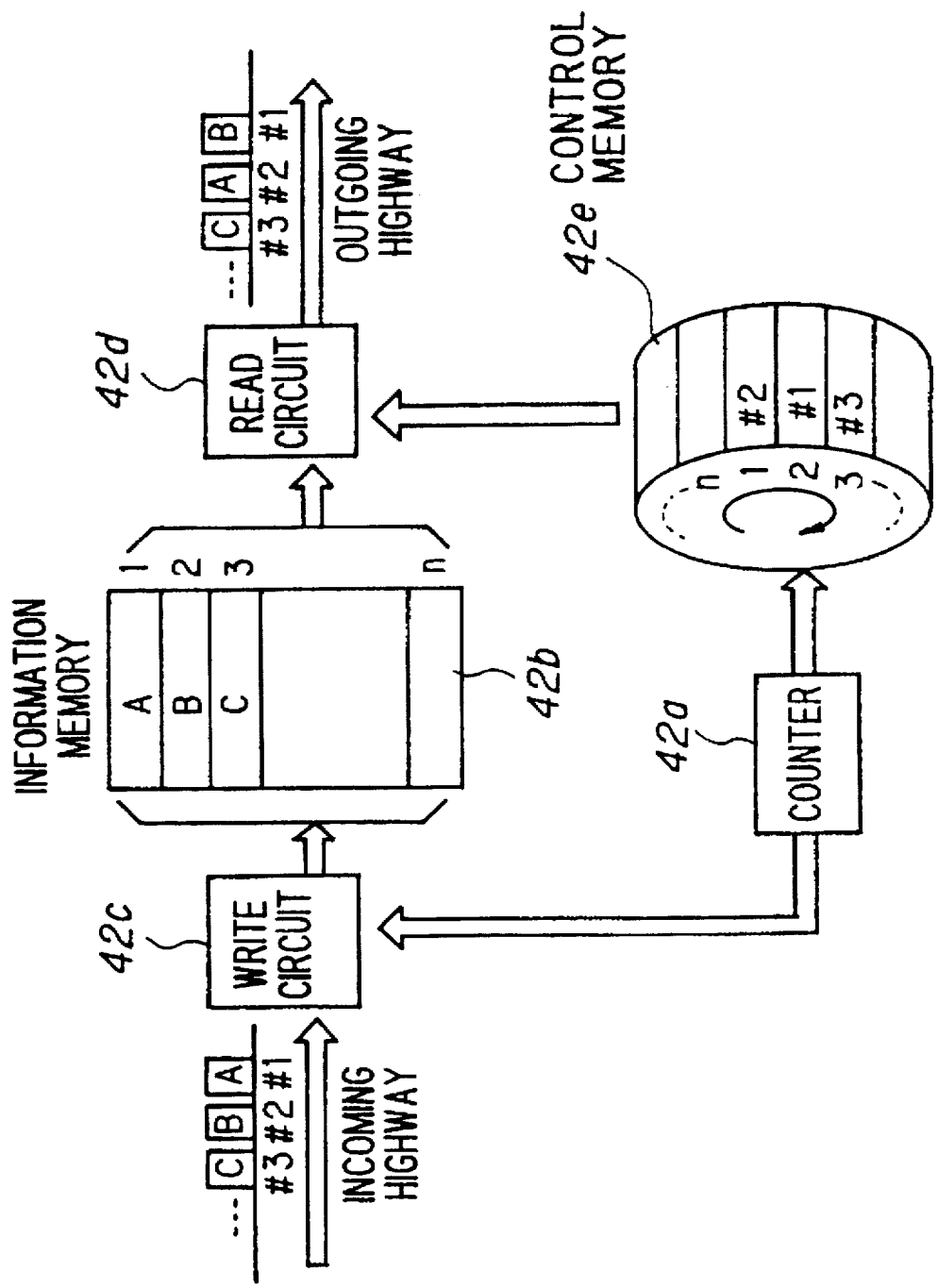

METHOD OF SENDING AND RECEIVING SETTING INFORMATION AND MONITORING INFORMATION IN COMMUNICATION APPARATUS

BACKGROUND OF THE INVENTION

This invention relates to a method of sending and receiving setting information and monitoring information in a communication apparatus. More particularly, the invention relates to a method of sending and receiving setting information and monitoring information between a monitoring controller and each unit constructing a multiplexing section in a communication apparatus.

A multiplexing device includes a multiplexing section which interchanges time-division multiplexed data and then sends the data out on transmission lines, and a monitoring controller which monitors and controls each of the units constructing the multiplexing section. The multiplexing section includes a switch for switching (interchanging) the time-division multiplexed data, interfaces for receiving signals from transmission lines and sending signals out on transmission lines, and multiplexers/demultiplexers for time-division multiplexing signals that have entered from the interfaces and then entering the multiplexed signals into the switch, and for demultiplexing time-division multiplexed signals, which have been sent from the switch, and sending the demultiplexed signals to the interfaces.

FIG. 15 is a block diagram illustrating the construction of such a multiplexing device according to the prior art. Shown are interfaces IF1-1~IF1-N, IF2-1~IF2-N, . . . IFM-1~IFM-N which receive signals from transmission lines L1-1~L1-N, L2-1~L2-N, . . . LM-1~LM-N, multiplexers MUX-1~MUX-M for time-division multiplexing signals outputted by interfaces IF1-1~IF1-N, IF2-1~IF2-N, . . . IFM-1~IFM-N, respectively, a switch SW for interchanging time-division multiplexed data, demultiplexers DMUX-1~DMUX-M for demultiplexing and outputting time-division multiplexed signals sent from the switch SW, and interfaces IF1-1'~IF1-N', IF2-1'~IF2-N', . . . IFM-1'~IFM-N' sending signals, which have been outputted by the demultiplexers DMUX-1~DMUX-M, to transmission lines L1-1'~L1-N', L2-1'~L2-N', . . . LM-1'~LM-N'. These units construct a multiplexing section. A monitoring controller MNC sets various information in the units constructing the multiplexing section and accepts monitoring information from each unit. An external unit EXU is a work station or personal computer connected to the monitoring controller MNC via a bus BUS. Information set in each unit is entered into the monitoring controller MNC and monitoring information indicative of each unit is accepted from the monitoring controller MNC.

Though the interfaces on the receiving side and the interfaces on the transmitting side are illustrated in spaced relation in FIG. 15 to clarify the hardware configuration, these are actually contained in respective ones of the same packages. For example, the interface IF1-1 and the interface IF1-1' are included in the same package, the interfaces IF1-2, IF1-2' are included in the same package, and the other interfaces on the left and right sides are similarly included in the same packages. Further, though the multiplexers MUX-1~MUX-M and demultiplexers DMUX-1~DMUX-M also are shown in spaced relation, these are contained in respective ones of the same packages. For example, the multiplexer MUX-1 and the demultiplexer DMUX-1 are included in the same package, and the other multiplexers and demultiplexers are similarly included in the same packages.

The monitoring controller MNC is connected to the packages by respective ones of dedicated buses (indicated by the dashed lines). In order to transfer setting information from the monitoring controller MNC to a prescribed package, the transfer is performed using the bus corresponding to the package. Similarly, in a case where monitoring information is transferred from a package to the monitoring controller MNC, this is carried out using the bus corresponding to the package. Examples of the setting information are as follows:

(1) information indicating whether a prescribed lamp is lit or extinguished;

(2) information indicating which switching procedure is used;

(3) information indicating whether an alarm signal is transferred when an alarm is detected;

(4) threshold information regarded as an alarm;

(5) transmission-line coding information;

(6) information indicting whether scrambling is applied; and (7) information indicating whether a signaling signal is imbedded in channel units.

Further, the monitoring information includes various alarm information. Examples of alarms are as follows:

(1) LOS (loss of sync); issued when a synchronizing signal cannot be detected;

(2) LOF (loss of frame); issued when a frame signal cannot be detected;

(3) B1, B2 setting error;

(4) AIS (alarm indication signal); and (5) FERF (far-end receive failure).

FIG. 16 is a diagram showing the construction of each package. The package includes a main-signal processor 1 for processing and sending a main signal in accordance with setting information, a driver/receiver 2 for sending and receiving setting information and monitoring information to and from the monitoring controller MNC, a monitoring control interface 3 for sending and receiving setting/monitoring information to and from the main-signal processor 1, an information setting unit 4 for setting various setting information, which has entered from the monitoring controller MNC, in the main-signal processor 1, and an alarm detector 5 for detecting various alarms in the main-signal processor 1 and entering the alarms into the monitoring control interface 3.

The following problems arise in this monitoring control system according to the prior art.

(1) Signal lines for establishing a monitoring control bus are required for each package. In modern devices, the main signal is becoming increasingly faster, e.g., 150 Mb/s, 600 Mb/s, 2.4 Gb/s, 10 Gb/s, and signals often are dealt with as parallel data within the device. As a consequence, a large number of connector pins are used and space for the pins of signal lines constituting the monitoring control bus cannot be provided.

(2) It is required that all packages be provided with a driver/receiver for the monitoring control bus. Since recent packages require many functions, mounting is performed at very high density. However, since a driver/receiver for the monitoring control bus must be mounted, space is needed for this. The result is circuitry of larger size, which leads to problems in terms of high-density mounting.

(3) A large amount of power is consumed by the circuit for the monitoring control bus. Since it is required that all packages be provided with a driver/receiver for the monitoring control bus, there is an increase in overall power consumption.

(4) The monitoring control bus cannot operate at high speed. In the conventional monitoring control system, the monitoring control bus is used at a speed of 8 Mb/s upon taking the size of the circuitry and power consumption into account. However, a speed on this order leads to a problem in terms of processing capability in a device that deals with large quantities of alarm information and setting information. It is required that the operating speed of such devices be increased.

SUMMARY OF THE INVENTION

Accordingly, an object of the present invention is to provide a method of sending and receiving setting information and monitoring information in which the monitoring controller need not be connected to each package individually by a monitoring control bus.

Another object of the present invention is to provide a method of sending and receiving setting information and monitoring information in which a driver/receiver need not be provided for each package.

A further object of the present invention is to provide a method of sending and receiving setting information and monitoring information in such a manner that power consumption can be reduced and speed increased.

In accordance with the present invention, the foregoing objects can be obtained by providing a method of sending and receiving information in a communication apparatus including a multiplexing section having a time switch for sending time-division multiplexed data, which have entered from a plurality of incoming lines, to prescribed outgoing lines upon switching time slot positions of the time-division multiplexed data, and a plurality of units connected to the time switch via incoming and outgoing lines, and a monitoring controller for sending information specifying operation of the units to the units constructing the multiplexing section and setting the information in these units, and for receiving monitoring information from the units, the method comprising the steps of connecting an output side of the monitoring controller and an input side of the time switch by an incoming line and connecting an input side of the monitoring controller and an output side of the time switch by an outgoing line; in a case where setting information is transferred from the monitoring controller to a unit, causing the monitoring controller to time-division multiplex the setting information for the unit to a prescribed time slot and enter the setting information into the time switch via the incoming line; causing the time switch to switch the time slot position of the setting information and then send the setting information to an outgoing line corresponding to the above-mentioned unit; causing the unit to drop the setting information from the time slot; in a case where monitoring information is transferred from a unit to the monitoring controller, causing the unit to time-division multiplex the monitoring information to a predetermined time slot and enter the monitoring information into the time switch from an incoming line corresponding to the unit; causing the time switch to switch the time slot position of the monitoring information and then send the monitoring information to the monitoring controller via an outgoing line corresponding to the monitoring controller; and causing the monitoring controller to accept the monitoring information of this time slot from the unit.

Further, the foregoing objects are attained by providing a method of sending and receiving information in a communication apparatus including a multiplexing section having a space switch for sending time-division multiplexed data, which have entered from a plurality of incoming lines, to prescribed outgoing lines upon switching the data on the prescribed outgoing lines, and a plurality of units connected to the space switch via incoming and outgoing lines, and a monitoring controller for sending information specifying operation of each unit to the units constructing the multiplexing section and setting the information in these units, and for receiving monitoring information from each unit, the method comprising the steps of connecting an output side of the monitoring controller and an input side of the space switch by an incoming line and connecting an input side of the monitoring controller and an output side of the space switch by an outgoing line; in a case where setting information is transferred from the monitoring controller to a prescribed unit, causing the monitoring controller to time-division multiplex the setting information to a prescribed time slot corresponding to the unit and then enter the setting information into the space switch via the incoming line; causing the space switch to send the setting data of the prescribed time slot to an outgoing line corresponding to the unit upon switching the setting data to this outgoing line; causing the unit to drop the setting information from the time slots; in a case where monitoring information is transferred from a unit to the monitoring controller, causing the unit to time-division multiplex the monitoring information to a time slot corresponding to the unit and then enter the monitoring information into the space switch; causing the space switch to send the monitoring information of this time slot to the monitoring controller upon switching the monitoring information to an outgoing line corresponding to the monitoring controller; and causing the monitoring controller to accept the monitoring information of this time slot from the unit.

Further, the foregoing objects are attained by providing a method of sending and receiving information in a communication apparatus including a multiplexing section having a cell switch for switching cells, which have entered from a plurality of incoming lines, to prescribed lines upon referring to header information contained in the cells, and a plurality of units connected to the cell switch via incoming and outgoing lines, and a monitoring controller for sending information specifying operation of the units to the units constructing the multiplexing section and setting the information in these units, and for receiving monitoring information from each unit, the method comprising the steps of connecting an output side of the monitoring controller and an input side of the cell switch by an incoming line and connecting an input side of the monitoring controller and an output side of the cell switch by an outgoing line; in a case where setting information is transferred from the monitoring controller to a prescribed unit, causing the monitoring controller to assemble the setting information into a cell and entering the cell into the cell switch via the incoming line; causing the cell switch to send the cell to an outgoing line corresponding to the unit based upon the header information contained in the cell; causing the unit to disassemble the cell and drop the setting information; in a case where monitoring information is transferred from a unit to the monitoring controller, causing the unit to assemble the monitoring information into a cell and enter the cells into the cell switch; causing the cell switch to send the cell to the outgoing line corresponding to the monitoring controller based upon the header information contained in the cell; and causing the monitoring controller to disassemble the cell and accept the monitoring information from the above-mentioned unit.

Other features and advantages of the present invention will be apparent from the following description taken in conjunction with the accompanying drawings.

5

BRIEF DESCRIPTION OF THE DRAWINGS

FIG. 4 is a diagram showing the construction of a package (for a case where a switch is a cell switch);

FIG. 5 is a diagram for describing the principle of a time switch for a case in which there is one incoming line and one outgoing line;

DESCRIPTION OF THE PREFERRED EMBODIMENTS

(A) Overview of the Invention

Figure 1:
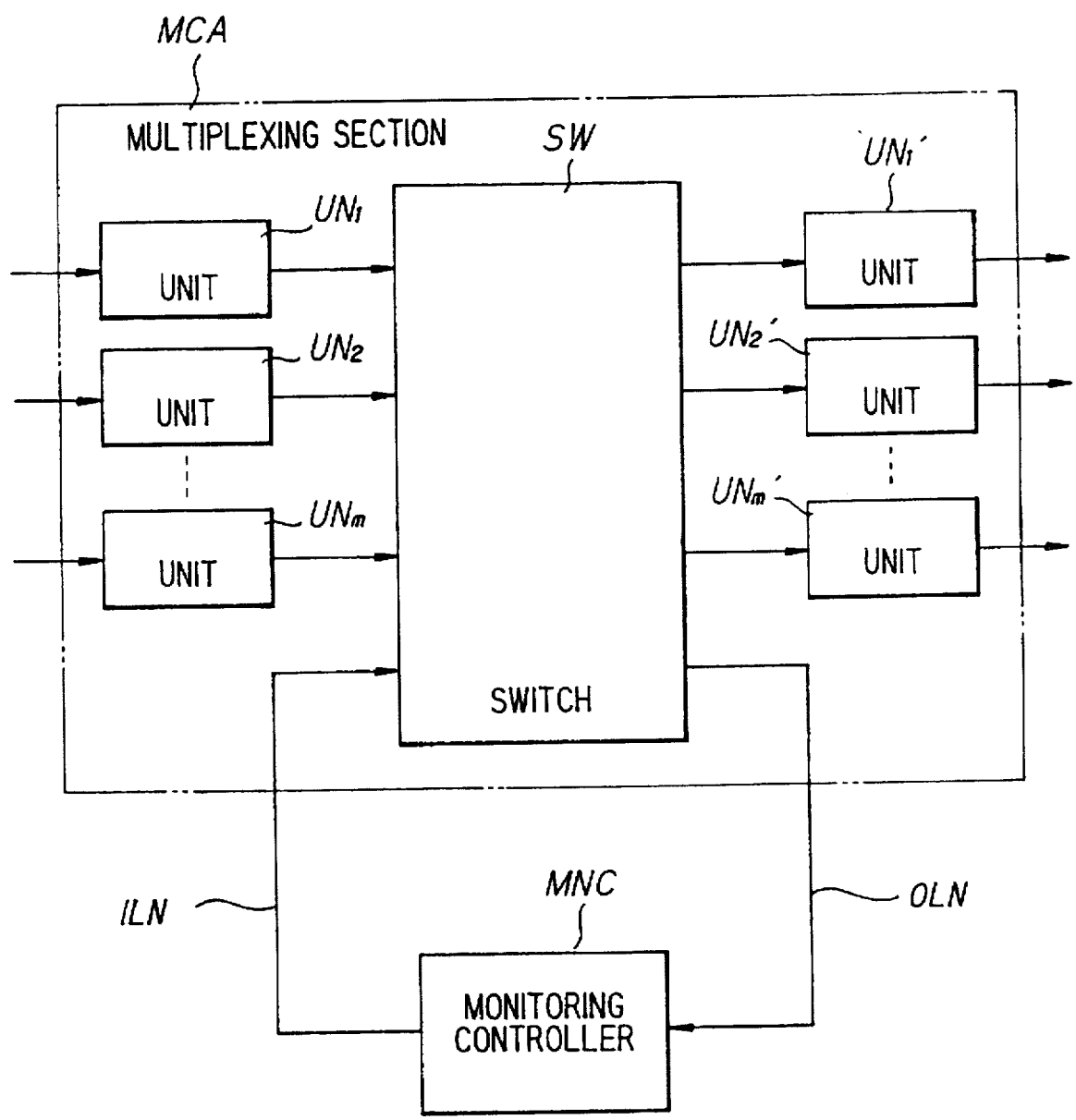
FIG. 1 is a diagram for describing an overview of the present invention.

FIG. 1 is a diagram for describing an overview of the present invention.

Shown in FIG. 1 are a multiplexing section MCA for switching (interchanging) signals and then sending the signals out on transmission lines, and a monitoring controller MCA for monitoring and controlling each of the units constructing the multiplexing section. The multiplexing section MCA has a switch SW for switching input signals on incoming and outgoing lines, and units $UN_1 \sim UN_m$, $UN_1' \sim UN_m'$ such as interfaces and multiplexers/demultiplexers constructing the multiplexing section. An incoming line ILN connects the output side of the monitoring controller MNC and the input side of the switch SW, and an outgoing line OLN connects the input side of the monitoring controller MNC and the output side of the switch SW. The units $UN_1 \sim UN_m$ on the left side and the corresponding units $UN_1' \sim UN_m'$ on the right side are included in the same package.

The switch SW is constituted by a time switch for switching time slot positions of time-division multiplexed data, which have entered from a plurality of incoming lines, and then sending the data to prescribed outgoing lines. In a

6 case where setting information is transferred from the monitoring controller MNC to prescribed units $UN_1$, $UN_1' \sim UN_m$, $UN_m'$, the monitoring controller MNC time-division multiplexes the setting information for these units to prescribed time slots and enters the setting information into the time switch SW via the incoming line ILN. The switch SW switches the time slot positions of the setting information and then sends the setting information to the outgoing lines that correspond to the above-mentioned units. The units drop the setting information from the time slots. Further, in a case where monitoring information is transferred from units to the monitoring controller MNC, the units time-division multiplex the monitoring information to predetermined time slots and enter the monitoring data into the time switch SW from prescribed incoming lines. The time switch interchanges the time slot positions of the monitoring information and then sends the monitoring information to the monitoring controller MNC via the outgoing line OLN. The monitoring controller MNC accepts the monitoring information of these time slots from the units.

If this arrangement is adopted, the monitoring controller need not be connected to each individual package by a monitoring control bus. As a result, a driver/receiver need not be provided for each package, thus making it possible to reduce circuit size. Moreover, the problem of providing enough space for pins does not arise. In addition, it is possible to reduce power consumption and raise speed.

The switch SW may be constituted by a space switch for sending time-division multiplexed data, which have entered from a plurality of incoming lines, upon switching the data on prescribed outgoing lines. In a case where setting information is transferred from the monitoring controller MNC to prescribed units $UN_1$, $UN_1' \sim UN_m$, $UN_m'$, the monitoring controller MNC time-division multiplexes the setting information to prescribed time slots corresponding to the units and enters the setting information into the time switch SW via the incoming line ILN. The space switch SW sends the setting information of these time slots upon interchanging the setting data on outgoing lines corresponding to the units. The units drop the setting information from these time slots. Further, in a case where monitoring information is sent from units to the monitoring controller MNC, the units time-division multiplex the monitoring information to time slots corresponding to these units and then enter the monitoring information into the space switch. The space switch sends the monitoring information of these time slots to the monitoring controller MNC upon switch the monitoring information on the outgoing line OLN. The monitoring controller MNC accepts the monitoring information of these time slots from the units.

If this arrangement is adopted, the monitoring controller need not be connected to each individual package by a monitoring control bus. As a result, a driver/receiver need not be provided for each package, thus making it possible to reduce circuit size. Moreover, the problem of providing enough space for pins does not arise. In addition, it is possible to reduce power consumption and raise speed.

The switch may be constituted by a cell switch for switching cells, which have entered from a plurality of incoming lines, to prescribed outgoing lines upon referring to header information contained in the cells. In a case where setting information is transferred from the monitoring controller MNC to prescribed units $UN_1$, $UN_1' \sim UN_m$, $UN_m'$, the monitoring controller MNC forms the setting information into cells and enters the cells into the cell switch SW via the incoming line ILN. The cell switch SW sends the cells to outgoing lines corresponding to the units based upon the header information contained in the cells. The units disassemble the cells and drop the setting information. In a case where monitoring information is transferred from units to the monitoring controller MNC, the units assemble the monitoring information into cells and enter the cells into the cell switch SW. The cell switch sends the cells to the outgoing line OLN based upon the header information of the cells, and the monitoring controller disassembles the cells and accepts the monitoring information from the above-mentioned units.

If this arrangement is adopted, the monitoring controller need not be connected to each individual package by a monitoring control bus. As a result, a driver/receiver need not be provided for each package, thus making it possible to reduce circuit size. Moreover, the problem of providing enough space for pins does not arise. In addition, it is possible to reduce power consumption and raise speed.

(B) Embodiment (a) Overall Configuration

Figure 2:
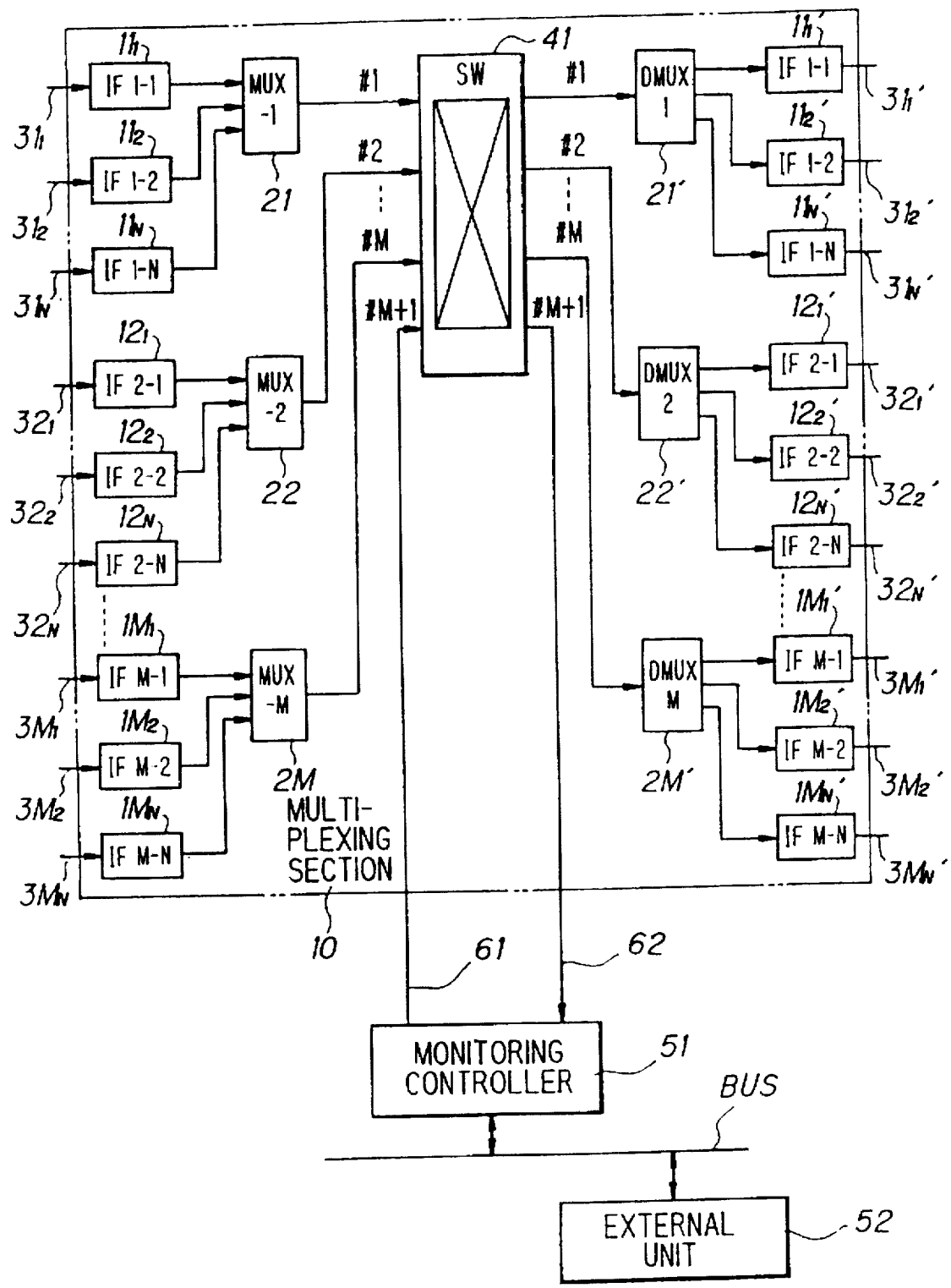
FIG. 2 is a diagram showing the construction of a multiplexing device.

FIG. 2 is a diagram showing the overall configuration of a multiplexing device according to the present invention. The multiplexing device includes a multiplexing section 10 for switching signals and sending the signals out on transmission lines, and a monitoring controller 51 for monitoring and controlling each of the units constructing the multiplexing section 10. The monitoring controller 51 sets various information in each unit and accepts monitoring information indicative of alarms and the like from each unit. An external unit 52 is a work station or personal computer connected to the monitoring controller 51 via a bus BUS. Information set in each unit is entered into the monitoring controller 51 and monitoring information indicative of each unit is accepted from the monitoring controller 51.

The multiplexing section 10 includes interfaces (IF1-1~IF1 -N, IF2-1~IF2-N, . . . IFM-1~IFM-N) $11_1$~$11_N$, $12_1$~$12_N$, . . . , $1M_1$~$1M_N$ which receive signals from transmission lines $31_1$~$31_N$, $32_1$~$32_N$, . . . , $3M_1$~$3M_N$; multiplexers 21~2M for time-division multiplexing signals outputted by the interfaces $11_1$~$11_N$, $12_1$~$12_N$, . . . , $1M_1$~$1M_N$, respectively; and a switch (SW) 41. The switch 41 switches time slot positions of the time-division multiplexed data that have entered from a plurality of incoming lines $\#_1$~$\#_{M+1}$, or switches the paths of the time-division data that have entered from the plurality of incoming lines $\#_1$~$\#_{M+1}$, and sends the data out on prescribed outgoing lines $\#_1$~$\#_{M+1}$. Examples of switches that can be used as the switch 41 are: (1) a time switch for switch time slot positions of time-division multiplexed data, which have entered from the plurality of incoming lines, and then sending the data to prescribed outgoing lines; (2) a space switch for switching the paths of time-division multiplexed data, which have entered from the plurality of incoming lines, and then sending the data to prescribed outgoing lines; and (3) a cell switch (ATM switch) for switching cells, which have entered from the plurality of incoming lines, to prescribed outgoing lines upon referring to header information contained in the cells.

The multiplexing section 10 further includes demultiplexers (DMUX-1~DMUX-M) 21'~2M' for demultiplexing and outputting time-division multiplexed signals sent from the switch 41, and interfaces $11_1'$~$11_N'$, $12_1'$~$12_N'$, . . . . $1M_1'$~$1M_N'$ for sending signals, which have been outputted by the demultiplexers 21'~2M', to transmission lines $31_1'$~$31_N'$, $32_1'$~$32_N'$, . . . . $3M_1'$~$3M_N'$. Though the interfaces $11_1$~$11_N$, $12_1$~$12_N$, . . . . , $1M_1$~$1M_N$ on the receiving side and the interfaces $11_1'$~$11_N'$, $12_1'$~$12_N'$, . . . . , $1M_1'$~$1M_N'$ on the transmitting side are illustrated in spaced relation in FIG. 2 to clarify the hardware configuration, these are actually contained in the same packages. For example, the interface $11_1$ and the interface $11_1'$ are included in the same package, the interfaces $11_2$ and $11_2'$ are included in the same package, and so on. Further, though the multiplexers 21~2M and demultiplexers 21'~2M' also are shown in spaced relation, these are contained in the same package. For example, the multiplexer 21 and the demultiplexer 21' are included in the same package, the multiplexers 22 and 22' are included in the same package, and so forth. An incoming line 61 connects the output side of the monitoring controller 51 and the input side of the switch 41, and an outgoing line 62 connects the input side of the monitoring controller 51 and the output side of the switch 41.

In the prior art, the monitoring controller 51 is connected to each of the packages by dedicated buses. In the present invention, on the other hand, the monitoring controller 51 is connected solely to the switch 41. In other words, the various setting data from the monitoring controller 51 are all transferred to the target package via the switch 41. Further, various monitoring information from each package are transferred to the monitoring controller 51 via the switch 41.

The switch 41 is constituted by a time switch. In order to transfer setting information from the monitoring controller 51 to a prescribed package (e.g., units 21, 21'), the following operation is carried out: The monitoring controller 51 time-division multiplexes the setting information for the package to a prescribed time slot and then inputs the information to the time switch 41 from the incoming line 61 ($\#_{M+1}$). The time switch 41 switches the time slot of the setting information and then sends the setting information to the outgoing line #1 that corresponds to the above-mentioned package (units 21, 21'). The package drops the setting information from this time slot. Further, in order to transfer monitoring information from a prescribed package (units 21, 21') to the monitoring controller 51, the package time-division multiplexes the monitoring information to predetermined a time slot and enters the monitoring data into the time switch 41 from the prescribed incoming line. The time switch 41 switches the time slot positions of the monitoring information and then sends the monitoring information to the monitoring controller 51 via the outgoing line 62. The monitoring controller 51 accepts the monitoring information of this time slot from the unit 21.

Further, the switch 41 is constituted by a space switch. In order to transfer setting information from the monitoring controller 51 to a prescribed package (e.g., units 21, 21'), the following operation is carried out: The monitoring controller 51 time-division multiplexes the setting information to a prescribed time slot corresponding to the package and enters the setting information into the space switch 41 via the incoming line 61. The space switch 41 sends the setting information of this time slot to the outgoing line #1 corresponding to the above-mentioned package (units 21, 21'). The package drops the setting information from this time slot. Further, in order to transfer monitoring information from a prescribed package (units 21, 21') to the monitoring controller 51, the package time-division multiplexes the monitoring information to a time slot corresponding to the package and then enters the monitoring information into the space switch 41. The space switch 41 sends the monitoring information of this time slot to the outgoing line 62. The monitoring controller 51 accepts the monitoring information of this time slot from the package (units 21, 21').

Furthermore, the switch 41 is constituted by a cell switch. In order to transfer setting information from the monitoring controller 51 to a prescribed package (e.g., units 21, 21'), the following operation is carried out: The monitoring controller 51 forms the setting information into a cell and enters the cell into the cell switch 41 via the incoming line 61. The cell switch 41 sends the cell to the outgoing line #1 corresponding to the above-mentioned package (units 21, 21') based upon the header information contained in the cell. In order to transfer monitoring information from a prescribed package (units 21, 21') to the monitoring controller 51, the unit assembles the monitoring information into a cell and enters the cell into the cell switch 41. The cell switch 41 sends the cell to the outgoing line 62 based upon the header information of the cell, and the monitoring controller 51 disassembles the cell and accepts the monitoring information from the package (units 21, 21').

(b) Construction of Each Package

Figure 3:
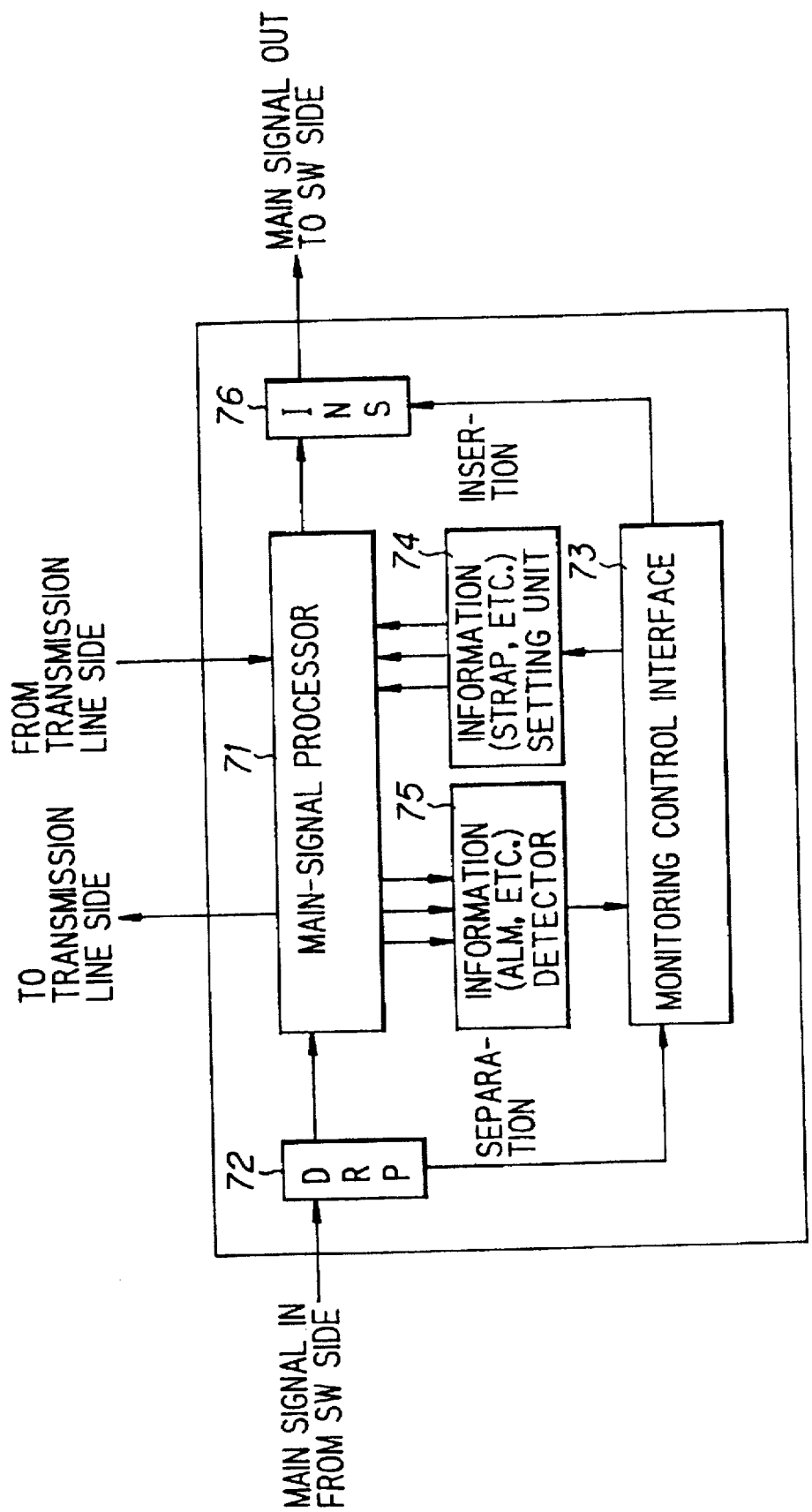
FIG. 3 is a diagram showing the construction of a package (for a case where a switch is a time switch or space switch)

FIG. 3 is a diagram showing the construction of each package in a case where the switch SW is constituted by the time switch or space switch. The package includes a main-signal processor 71 for processing a main signal in accordance with setting information and then sending the processed signal. In a case where the package is an interface package, the processor 71 executes sending/receiving interface processing. If the package is multiplexing/demultiplexing package, the processor 71 executes multiplexing/demultiplexing processing. The processor 71 executes switching processing if it is a switch package.

The package further includes a setting-information dropper (DRP) 72. Setting information from the monitoring controller 51, which information has been multiplexed to a prescribed time slot, is dropped from the time slot by the dropper 72. The package has a monitoring control interface 73 for sending and receiving setting/monitoring information to and from the main-signal processor 71, an information setting unit 74 for setting various setting information, which has been transferred from the monitoring controller 51, in the main-signal processor 71, an alarm detector 75 for detecting various alarms in the main-signal processor 71 and entering the alarms into the monitoring control interface 73, and a monitoring information insertion unit (INS) 76 for inserting monitoring information, which is transferred to the monitoring controller 51, into a prescribed time slot.

In the prior art, the package is provided with a driver/receiver and is connected to the monitoring controller 51 by a dedicated bus. In the present invention, on the other hand, the setting-information dropper 72 and the monitoring information insertion unit 76 are provided on either side of the main-signal processor 71. The sending and receiving of information to and from the monitoring controller 51 is carried out via these components and the switch.

FIG. 4 is a diagram showing the construction of each package in a case where the switch SW is constituted by the cell switch. The package includes a main-signal processor 81 for processing a main signal in accordance with setting information and then sending the processed signal, a cell dropper (DRP) 82 for dropping a cell (a setting information cell), which has a prescribed VPI/VCI, sent from the monitoring controller 51, and a monitoring control interface 83 for sending and receiving setting/monitoring information to and from the main-signal processor 81. The interface 83 has a CLAD circuit (cell assembly/disassembly circuit) 83a for disassembling a dropped cell into setting information or assembling monitoring information into a cell and then outputting the cell. The package further includes an information setting unit 84 for setting various setting information, which has been transferred from the monitoring controller 51, in the main-signal processor 81, an alarm detector 85 for detecting various alarms in the main-signal processor 81 and entering the alarms into the monitoring control interface 83, and a monitoring information insertion unit (INS) 86 for inserting a monitoring information cell.

(c) Embodiment in Which Switch is Constituted by Time Switch (c-1) Principles of Time Switch A time switch switches the time slot positions of time-division multiplexed data, which have entered from a plurality of incoming lines, and then sends the data to prescribed outgoing lines.

FIG. 5 is a diagram for describing a time switch in a case where the time slot positions of time-division multiplexed data, which have entered from one incoming line (incoming highway), are switched and the resulting data are then send to one outgoing line (outgoing highway). Numeral 42a denotes a counter that is counted up cyclically from 1 to n at the period of the time slots, where n represents the number of the time slots. When the value of the count recorded in the counter 42a is i, the data of an ith time slot arrives at the incoming highway. Numeral 42b denotes an information memory of 8×n bits, assuming that one item of data is composed of eight bits. The time-division multiplexed data that has arrived from the incoming highway is stored in the information memory 42b in the order of the time slots. Numeral 42c designates a write circuit for writing data in the information memory 42b at an address i designated by the count i in counter 42a. For example, the write circuit 42c stores data A of a first frame at a first address of the information memory 42b. Numeral 42d denotes a read circuit for reading data out of the information memory 42b. Numeral 42e denotes a read control memory.

The read control memory 42e has n-number of addresses 1~n corresponding to n-number of time slots #1~#n. Written at each address is the relevant time slot number on the outgoing highway. For example, in order to switch the data A of the first time slot #1 on the incoming line to the second time slot #2 on the outgoing highway, "#2", which indicates the second time slot, is written at the first address of the read control memory 42e.

The write circuit 42c writes the data of the ith time slot, which has arrived from the incoming highway, in the information memory 42b at the ith address thereof, and the read circuit 42d reads data from an address designated by the control memory 42e and outputs the read data to the outgoing highway. More specifically, the control memory 42e enters a time slot number, which has been stored at an address that corresponds to the time slot number designated by the counter 42a, into the read circuit 42d, and the read circuit 42d reads the stored data from the address of the information memory 42b that conforms to the entered time slot number. The read circuit 42b sends this data out on the outgoing highway. Thus, in the example of FIG. 5, the data A of the first time slot on the incoming highway is switched to the second time slot on the outgoing highway and data B of the second time slot on the incoming highway is switched to the first time slot on the outgoing highway. Data C of the third time slot on the incoming highway does not have its time slot interchanged.

Figure 6A:
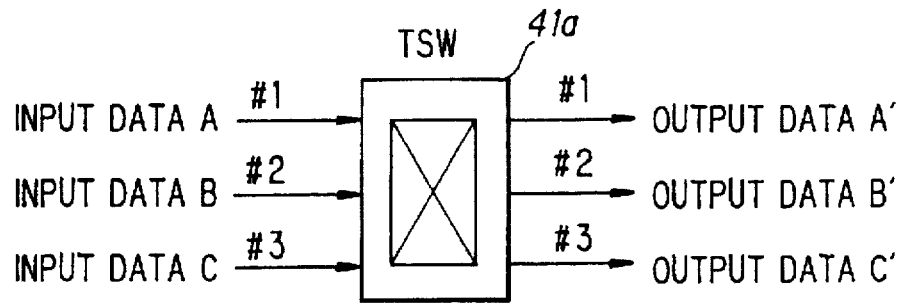
FIGS. 6A, 6B and 6C are diagrams for describing the principle of a time switch for a case in which there are a plurality of incoming lines and outgoing lines.
Figure 6B:
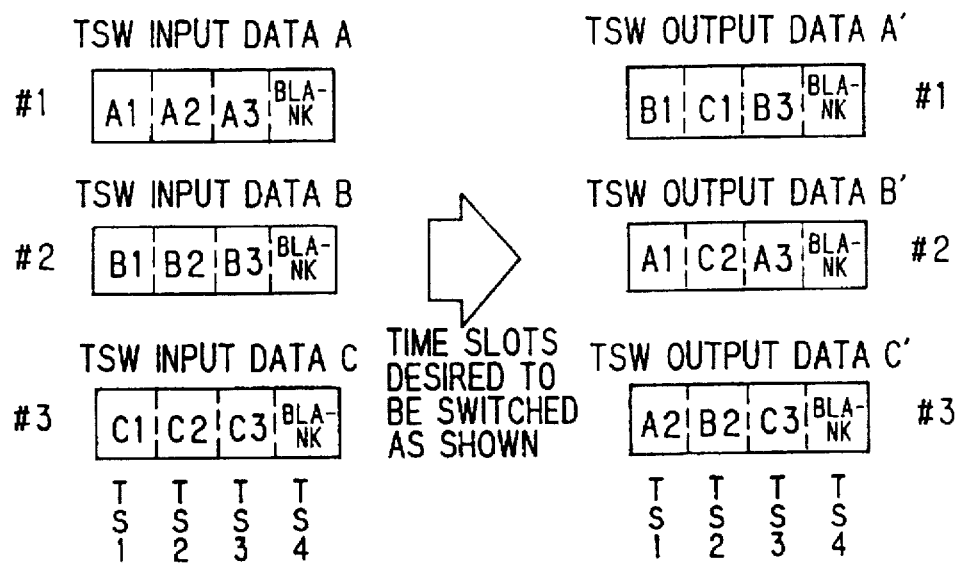
Figure 6C:
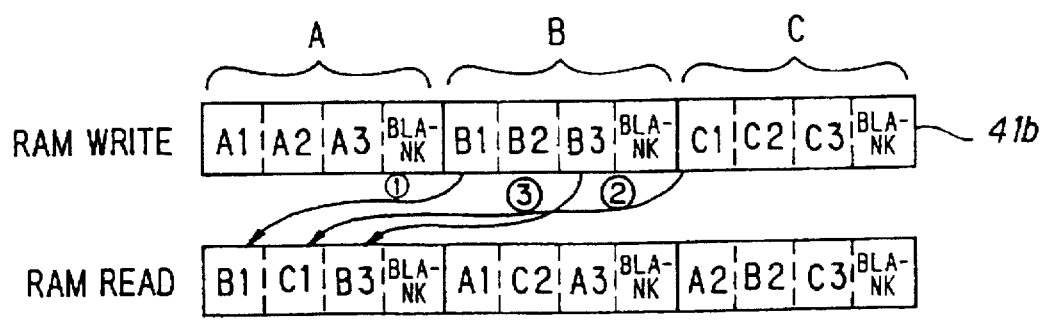

FIGS. 6A through 6C are diagrams for describing the principle of a time switch for switching the time slot positions of time-division multiplexed data, which have entered from a plurality of incoming lines, and sending the data out on prescribed outgoing lines.

In FIG. 6A, a time switch 41a switches time slot positions TS1~TS4 of data (time-division multiplexed data) A, B, C, which have entered from incoming lines #1~#3, and outputs the data as data (time-division multiplexed data) A', B', C' from prescribed outgoing lines #1~#3. In order to rearrange the input data A, B, C, shown in FIG. 6B, in each of the time slots TS1~TS4 and deliver the data as the output data A', B', C', the operation is as follows: The input data A, B, C from each of the incoming lines #1~#3 are written in an information memory (RAM) 41b in the order of the time slots, as illustrated in FIG. 6C. At readout, the data are read out and outputted from the information memory (RAM) 41b, per each slot of the times slots TS1~TS4 and per each outgoing line of the outgoing lines #1~#3, so as to obtain a desired sequence. For example, with regard to outgoing line #1, data B1, C1, B3 are read out of the information memory (RAM) 41b, as indicated by ①, ②, ③, in the order of the time slots, as illustrated in FIG. 6C.

Figure 7A:
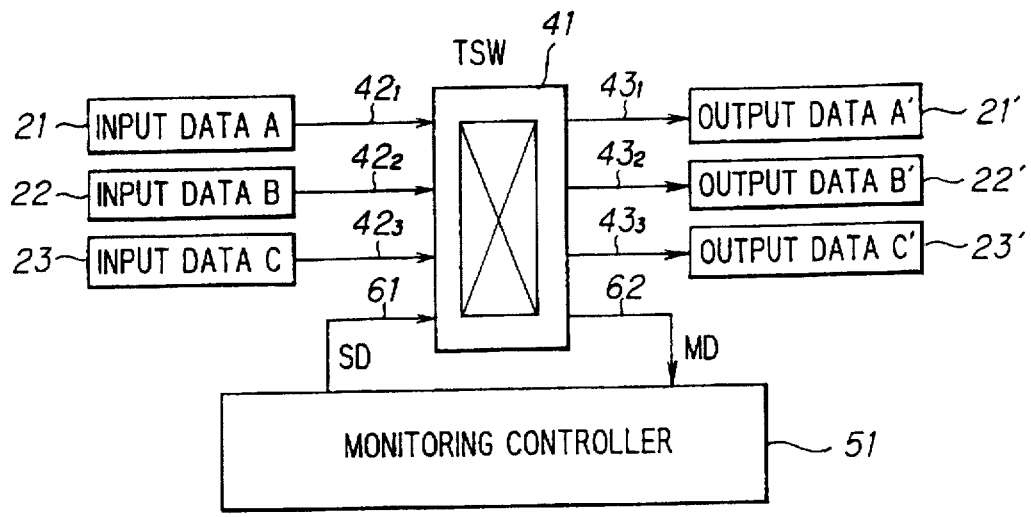
FIGS. 7A, 7B and 7C are diagrams for describing the sending and receiving of information in a case where a time switch is used.
Figure 7B:
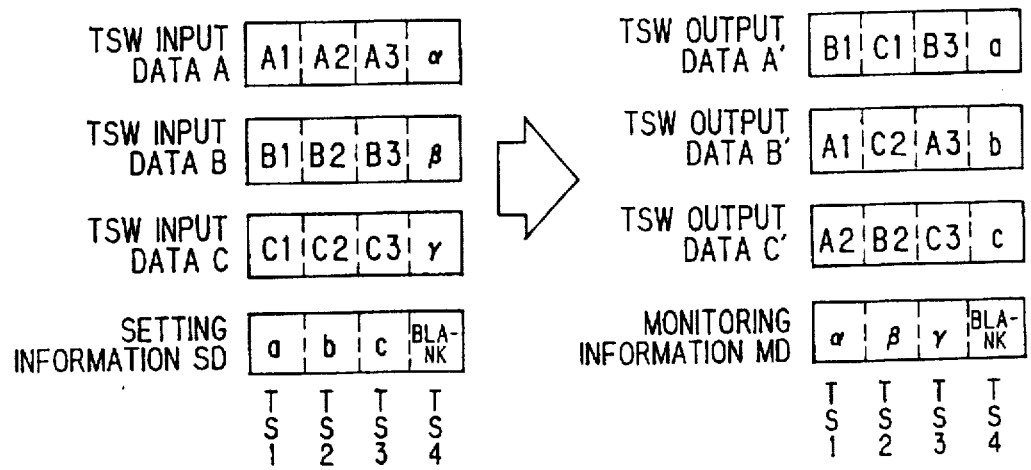
Figure 7C:
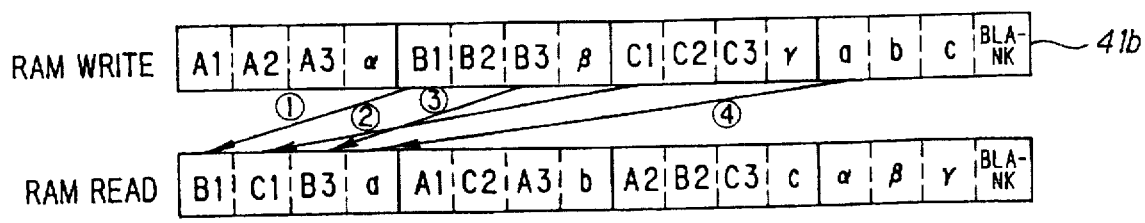

(c-2) Control for Sending/receiving Setting Information and Monitoring Information FIGS. 7A, 7B and 7C are diagrams for describing control for the sending and receiving of setting information and monitoring information in a case where a time switch is used. In FIG. 7A, numerals 21~23, 21'~23' denote units which construct a multiplexing section, numeral 41 denotes the time switch (TSW), numerals $42_1$~$42_3$ denote incoming lines for entering data A, B, C from the units 21~23 into the time switch 41, and numerals $43_1$~$43_3$ denote outgoing lines for outputting data A', B', C' from the time switch 41 to the units 21'~23'. Also shown are the monitoring controller 51, the incoming line 61 for entering time-division multiplexed setting information SD from the monitoring controller 51 to the time switch 41, and the outgoing line 62 for outputting time-division multiplexed monitoring information MD to the monitoring controller 51. The units 21, 21' are included in the same package, as are the units 22, 22' and the units 23, 23'. The monitoring controller 51 sends setting information package by package and acquires monitoring information package by package.

As shown in FIG. 7B, the packages (units 21, 21'; 22, 22'; 23, 23') respectively insert monitoring data α, β, γ, which are to be sent to the monitoring controller 51, into the fourth time slot TS4, and input the monitoring data into the time switch 41 together with the main-signal data A1~A3, B1~B3, C1~C3, respectively. Further, the monitoring controller 51 multiplexes setting information a destined for the first package to the first time slot TS1, multiplexes setting information b destined for the second package to the second time slot TS2, multiplexes setting information c destined for the third package to the third time slot TS3 (the fourth time slot TS4 is blank), and sends the information to the time switch 41.

The time switch 41 writes the time-division multiplexed data, which have entered from the incoming lines $42_1$~$42_3$, 61, in the internal RAM 41b in the order of the time slots, as illustrated at the top of FIG. 7C. The time switch 41 thenceforth reads the data a, b, c in the respective time slots TS1, TS2, TS3 of the setting information out of the RAM, inserts the data in the fourth time slot TS4 of the time-division multiplexed data destined for each package (units 21, 21'; 22, 22'; 23, 23') and sends the data to the outgoing lines $43_1$~$43_3$. Further, the time switch 41 goes to the RAM 41b to read out the monitoring information α, β, γ of the fourth time slot of the time-division multiplexed data that have entered from each package (units 21, 21'; 22, 22'; 23, 23'), inserts this monitoring information in the first, second and third time slots T1, TS2 and TS3 of the time-division data (monitoring information MD) destined for the monitoring controller 51, and outputs the result to the outgoing line 62.

For example, with regard to outgoing line $43_1$, the data B1, C1, B3, a are read out of the RAM and fed into the line in the order of the time slots, as shown at the bottom of FIG. 7C. Similarly, with regard to outgoing line $43_2$, the data A1, C2, A3, b are read out of the RAM and fed into the line in the order of the time slots. With regard to outgoing line $43_3$, the data A2, B2, C3, c are read out of the RAM and fed into the line in the order of the time slots. With regard to the outgoing line 62, the monitoring data α, β, γ are read out of the RAM 41b and outputted on the line in the order of the time slots.

The time-division data outputted on the outgoing lines $43_1$~$43_3$ enter the respective packages having the construction shown in FIG. 3. The setting-information dropper 72 of each package drops the setting information a, b or c from the fourth time slot TS4 and enters the dropped information into the monitoring control interface 73. The information setting unit 74 receives the monitoring information from the monitoring control interface 73 and sets it in the main-signal processor 71. It should be noted that the monitoring information insertion unit 76 inserts the monitoring data α, β or γ, which has entered from the monitoring control interface 73, in the fourth time slot TS4 and sends it to the side of the time switch.

Further, the monitoring controller 51 drops the monitoring data α of the first package (units 21, 21') from the first time slot, drops the monitoring data β of the second package (units 22, 22') from the second time slot, drops the monitoring data γ of the third package (units 23, 23') from the third time slot and performs predetermined monitoring control.

(d) Embodiment in Which Switch is Constituted by Space Switch (d-1) Principles of Space Switch A space switch sends time-division multiplexed data, which have entered from a plurality of incoming lines, upon switching the data on prescribed outgoing lines. Time slot positions are not switched.

Figure 8:
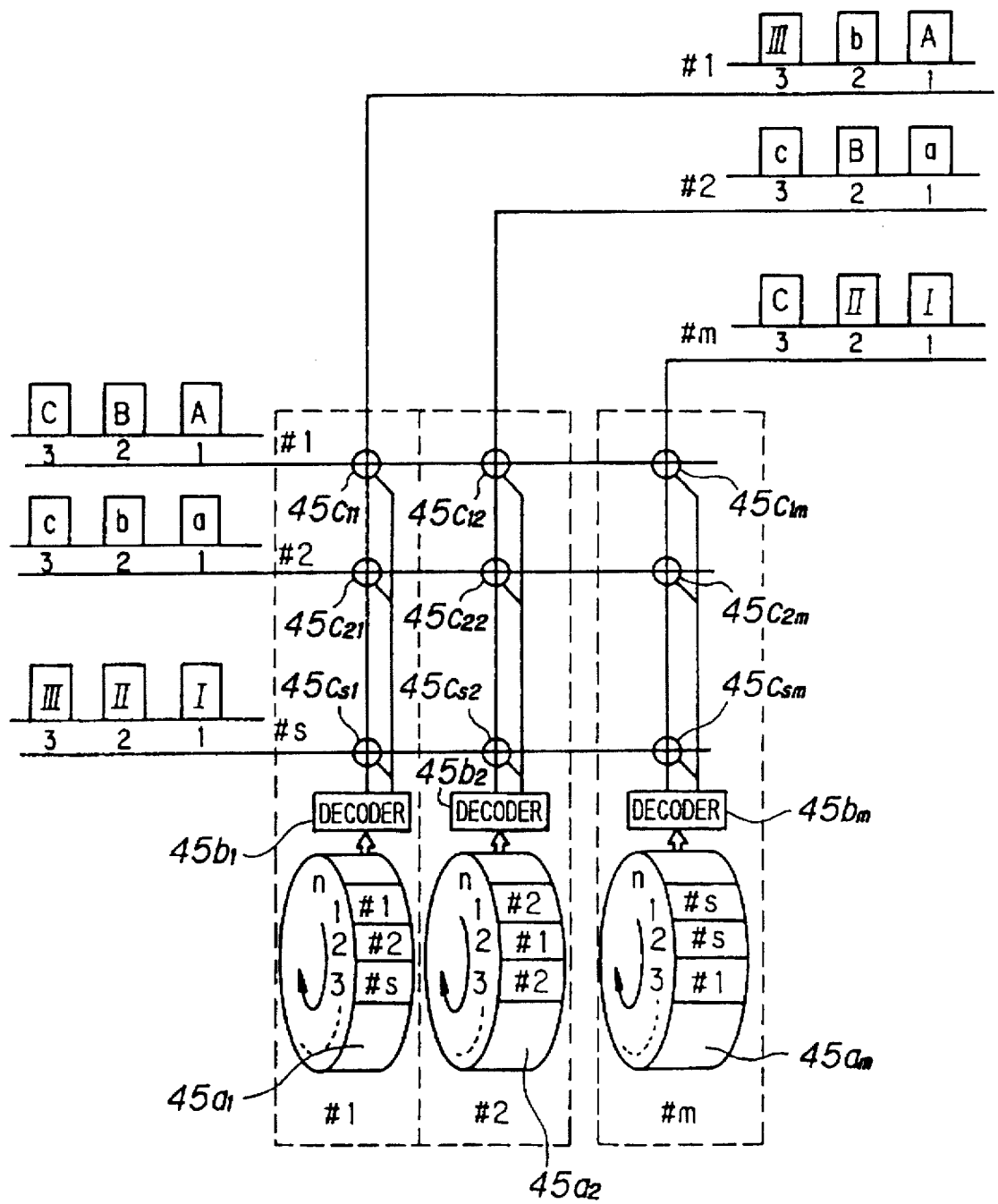
FIG. 8 is a diagram for describing the principle of a space switch.

FIG. 8 is a diagram for describing a space switch. Numerals $45a_1$~$45a_m$ denote control memories the number of which is the same as the number of outgoing highways. The number of addresses of each memory is the same as the number n of time slots. Written in the ith address of each control memory is a number which specifies the incoming highway to which the data that is to be sent to the ith time slot of the corresponding output highway belongs. For example, in a case where the data A of the first time slot of the first incoming highway #1 is sent to the first outgoing highway #1 as first time slot data, the first incoming highway number #1 is written at the first address of the first control memory $45a_1$. Numerals $45b_1$~$45b_m$ denote decoders, and numerals $45c_{11}$~$45_{sm}$ denote gates.

The contents of the control memories $45a_1$~$45a_m$ are read out cyclically, the decoders $45b_1$~$45b_m$ designate the time-division gates of the relevant incoming highways and the gate is opened for a period of time equivalent to the time slot. For example, the number #1 indicating the first incoming highway has been stored at the first address of the control memory $45a_1$ corresponding to the first outgoing highway. Accordingly, with regard to the first time slot, the decoder $45b_1$ opens the gate $45c_{11}$ so that the data A of the first time slot that enters from the first highway #1 is outputted to the first outgoing highway.

Figure 9A:
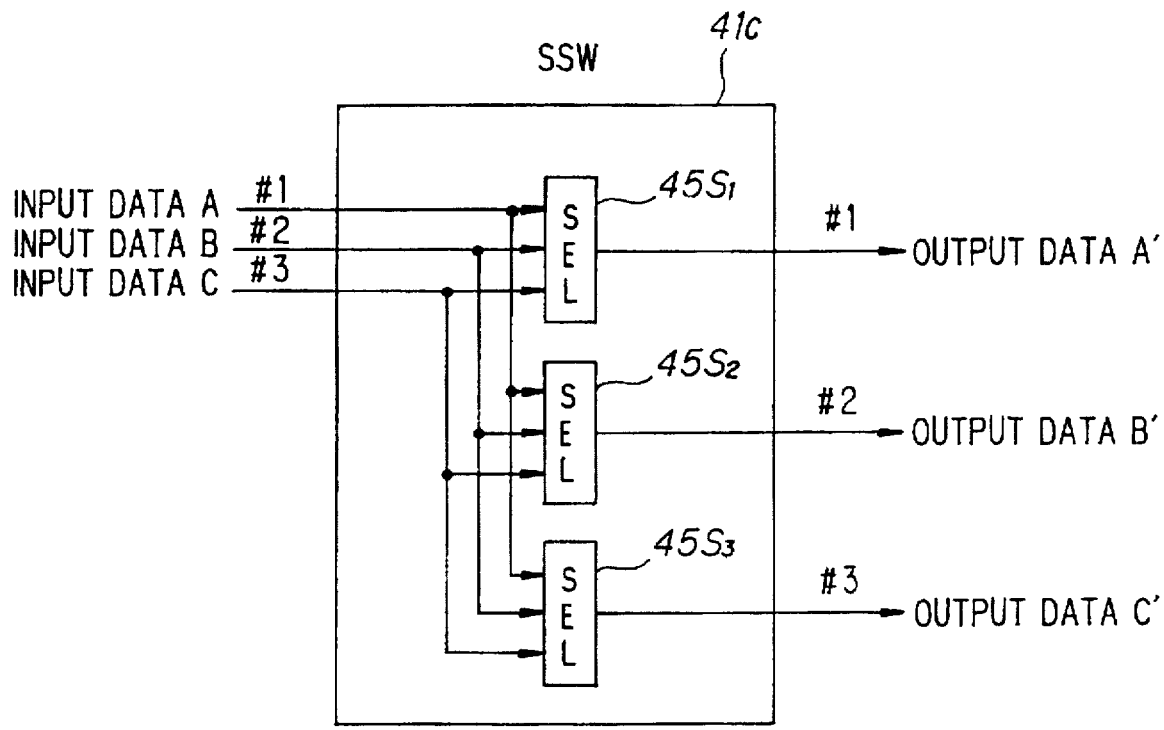
FIGS. 9A and 9B are diagrams representing a space switch in simple terms.
Figure 9B:
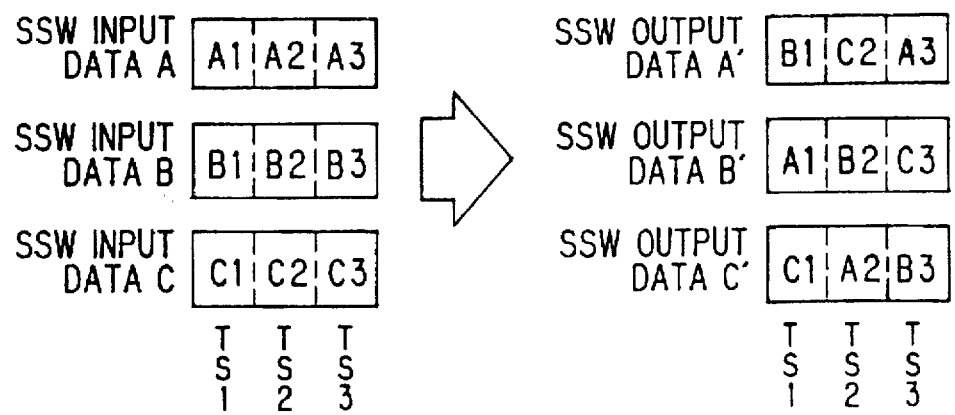

FIG. 9A is a simple representation of a space switch 41c. This is for a case in which there are three inputs and three outputs. The switch includes selectors $45S_1 \sim 45S_3$. The control memory $45a_i$, decoder $45b_i$ and the gates $45c_{1i} \sim 45c_{si}$ provided to correspond to each outgoing highway #i in FIG. 8 are consolidated to represent each selector. The space switch 41c switches the paths of the data in the time slots TS1~TS3 of the time-division multiplexed data A, B, C (see FIG. 9B) that have entered from the incoming lines #1~#3, and outputs the data from prescribed outgoing lines #1~#3 as time-division multiplexed data A', B', C'.

Figure 10A:
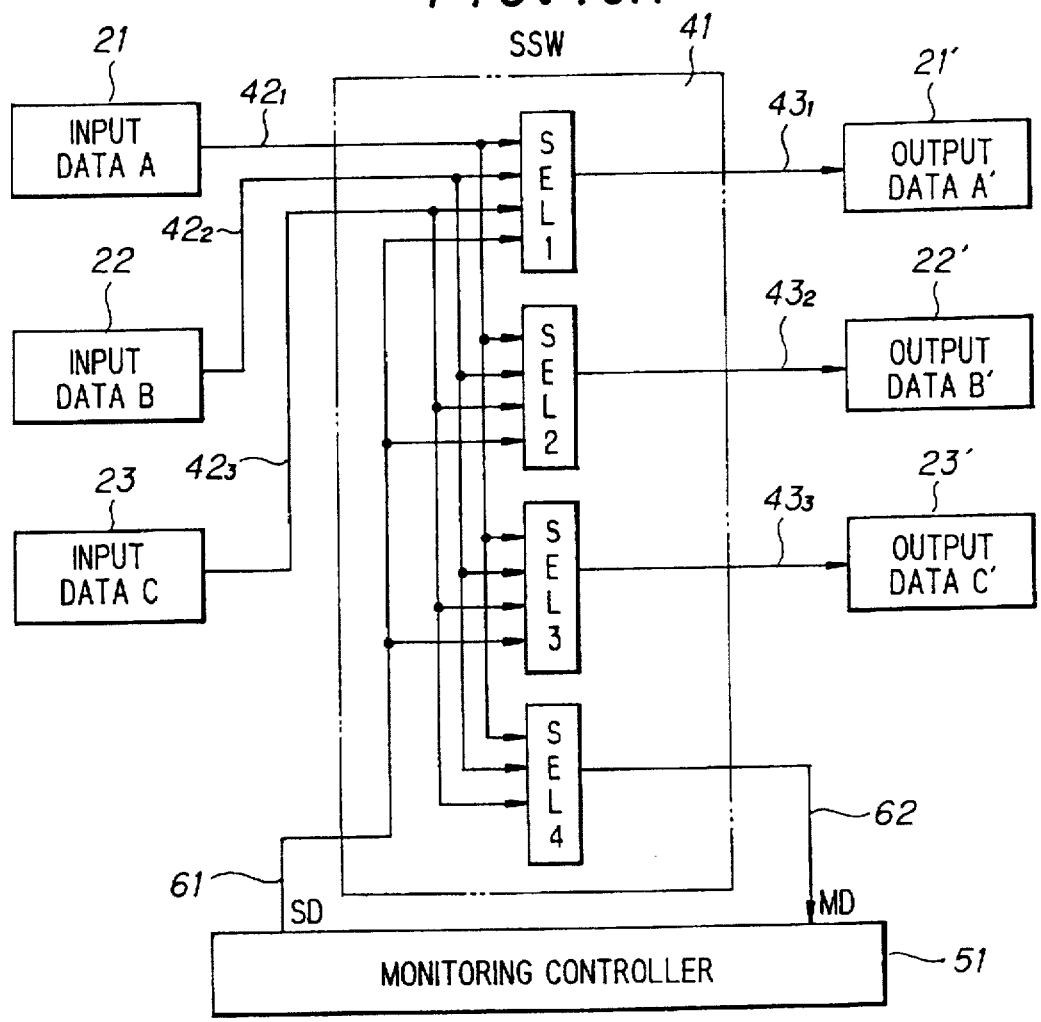
FIGS. 10A and 10B are diagrams for describing the sending and receiving of information in a case where a space switch is used.
Figure 10B:
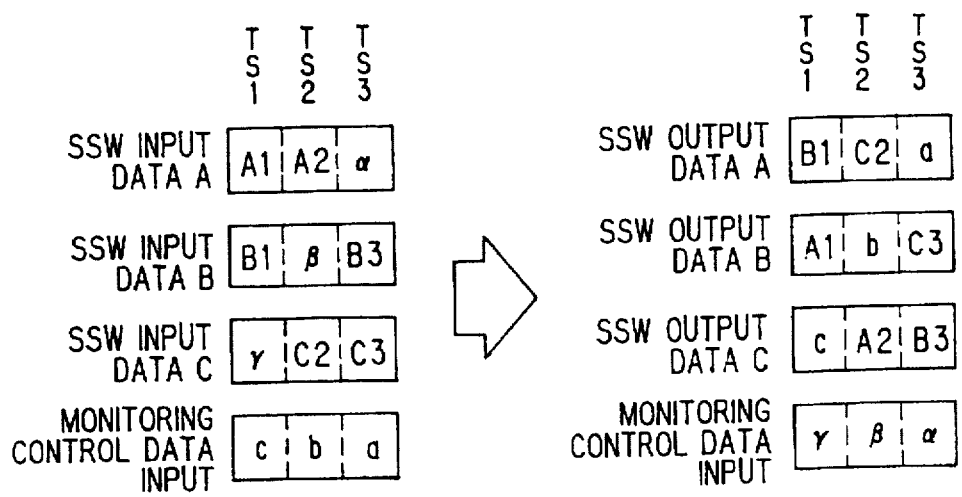

(d-2) Control for Sending/receiving Setting Information and Monitoring Information FIGS. 10A and 10B are diagrams for describing control for the sending and receiving of setting information and monitoring information in a case where a space switch is used. In FIG. 10A, numerals 21~23, 21'~23' denote units which construct a multiplexing section, numeral 41 denotes the space switch (SSW), which has selectors $SEL_1 \sim SEL_4$, numerals $42_1 \sim 42_3$ denote incoming lines for entering data A, B, C from the units 21~23 into the space switch 41, and numerals $43_1 \sim 43_3$ denote outgoing lines for outputting data A', B', C' from the space switch 41 to the units 21'~23'. Also shown are the monitoring controller 51, the incoming line 61 for entering time-division multiplexed setting information SD from the monitoring controller 51 to the space switch 41, and the outgoing line 62 for outputting time-division multiplexed monitoring information MD to the monitoring controller 51. The units 21, 21' are included in the same package, as are the units 22, 22' and the units 23, 23'. The monitoring controller 51 sends setting information package by package and acquires monitoring information package by package.

As shown in FIG. 10B, the packages (units 21, 21'; 22, 22'; 23, 23') respectively insert monitoring data α, β, γ, which are to be sent to the monitoring controller 51, into the third time slot TS3, second time slot TS2 and first time slot TS1, respectively, and input the monitoring data into the space switch 41 together with the main-signal data A1, A2; B1, B3; C2, C3, respectively. Further, the monitoring controller 51 multiplexes setting information a destined for the first package to the third time slot TS3, multiplexes setting information b destined for the second package to the second time slot TS2, multiplexes setting information c destined for the third package to the first time slot TS1, and sends the information to the space switch 41.

As shown in FIG. 10B, selectors SEL1~SEL4 of the space switch 41 switch the paths of the time-division data A, B, C, SD, which have entered from the incoming lines $42_1$, $42_2$, $42_3$, 61, and send the data to the outgoing lines that correspond to the packages. More specifically, the selector $SEL_1$ sends the main-signal data B1, C2 and the setting data a to the outgoing line $43_1$, which is destined for the first package (units 21, 21'), by switching the paths of these data to this line. The selector $SEL_2$ sends the main-signal data A1, the setting data b and the main-signal data C3 to the outgoing line $43_2$, which is destined for the first package (units 22, 22'), by switching the paths of these data to this line. The selector $SEL_3$ sends the setting data c and the main-signal data A2, B3 to the outgoing line $43_3$, which is destined for the third package (units 23, 23'), by switching the paths of these data to this line. Further, the selector $SEL_4$ of the space switch 41 sends the monitoring information α, β, γ in the third, second and first time slots of the time-division multiplexed data, which have entered from the respective packages (units 21, 21'; 22, 22'; 23, 23'), to the outgoing line 62 destined for the monitoring controller 51.

The time-division data outputted to the outgoing lines $43_1 \sim 43_3$ enter the respective packages having the construction shown in FIG. 3. The setting-information dropper 72 of the first package drops the setting information a from the third time slot TS3 and enters the dropped information into the monitoring control interface 73. The information setting unit 74 receives the setting information from the monitoring control interface 73 and sets it in the main-signal processor 71. The monitoring information insertion unit 76 inserts the monitoring data α, which has entered from the monitoring control interface 73, in the third time slot TS3 and sends it to the side of the space switch. In the case of the second package, the setting data b is dropped from the second time slot TS2 and the monitoring data β is inserted in the second time slot. In the case of the third package, the setting data c is dropped from the first time slot TS1 and the monitoring data γ is inserted in the first time slot.

Meanwhile, the monitoring controller 51 drops the monitoring data γ of the third package (units 23, 23') from the first slot, drops the monitoring data β of the second package (units 23, 23') from the second slot, drops the monitoring data α of the third package (units 23, 23') from the third slot and performs predetermined monitoring control.

Figure 11:
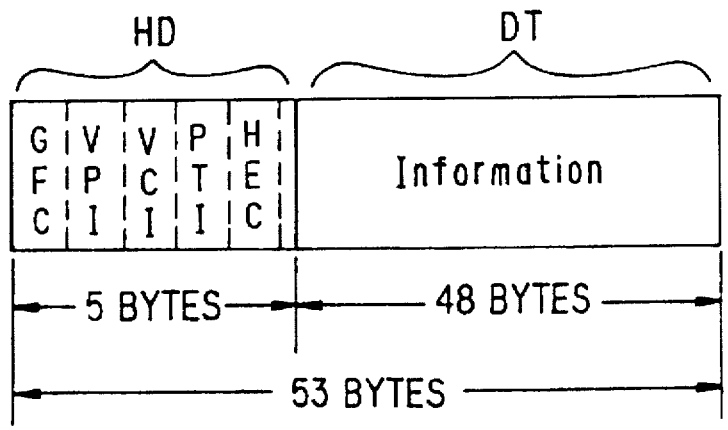
FIG. 11 is a diagram showing the constitution of a cell.

(e) Embodiment in Which Switch is Constituted by Cell Switch (e-1) Principles of Cell Switch As shown in FIG. 11, a cell is composed of a fixed-length block of 53 bytes of which five bytes constitute a header HD and 48 bytes an information field (also referred to as a "payload") DT. In order that the destination of the cell will be understood even after data is broken down into blocks, the header HD includes a virtual channel identifier (VCI) for call identifying purposes. The header HD further includes a virtual path identifier (VPI) that specifies other paths, a generic flow control (GFC) used in flow control between links, payload type identification (PTI) and a header error control (HEC) code, which is a code for correcting errors in the header.

Figure 12:
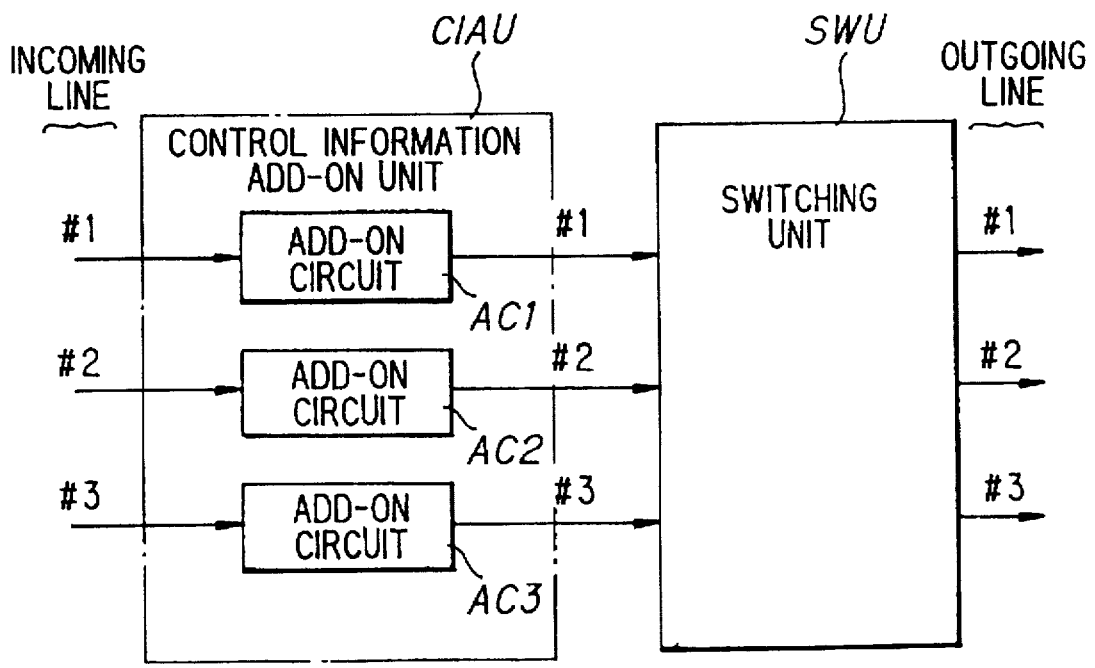
FIG. 12 is a diagram showing the construction of a cell switch.

FIG. 12 is a block diagram showing the construction of a cell switch (ATM switch, which includes a switching unit SWU and a control-information add-on unit CIAU. The input side of the switching module SWU is connected to incoming lines (incoming highways) #1~#3 via the control-information add-on unit CIAU, and the output side of the module SWU is connected to outgoing lines (outgoing highways) #1~#3. The control-information add-on unit CIAU is equipped with add-on circuits AC1~AC3, which correspond to the incoming lines #1~#3, respectively, for adding routing information (tag information) onto the input cell. The add-on circuits AC1~AC3 each have a routing table (not shown), refer to the table to add routing information onto the cell that has entered from the corresponding incoming line and to replace the VPI/VCI contained in the input cell then send the cell to the switching unit SWU. The switching unit SWU routes the cell to the prescribed outgoing lines #1~#3 based upon the routing information that has been added on.

Figure 13:
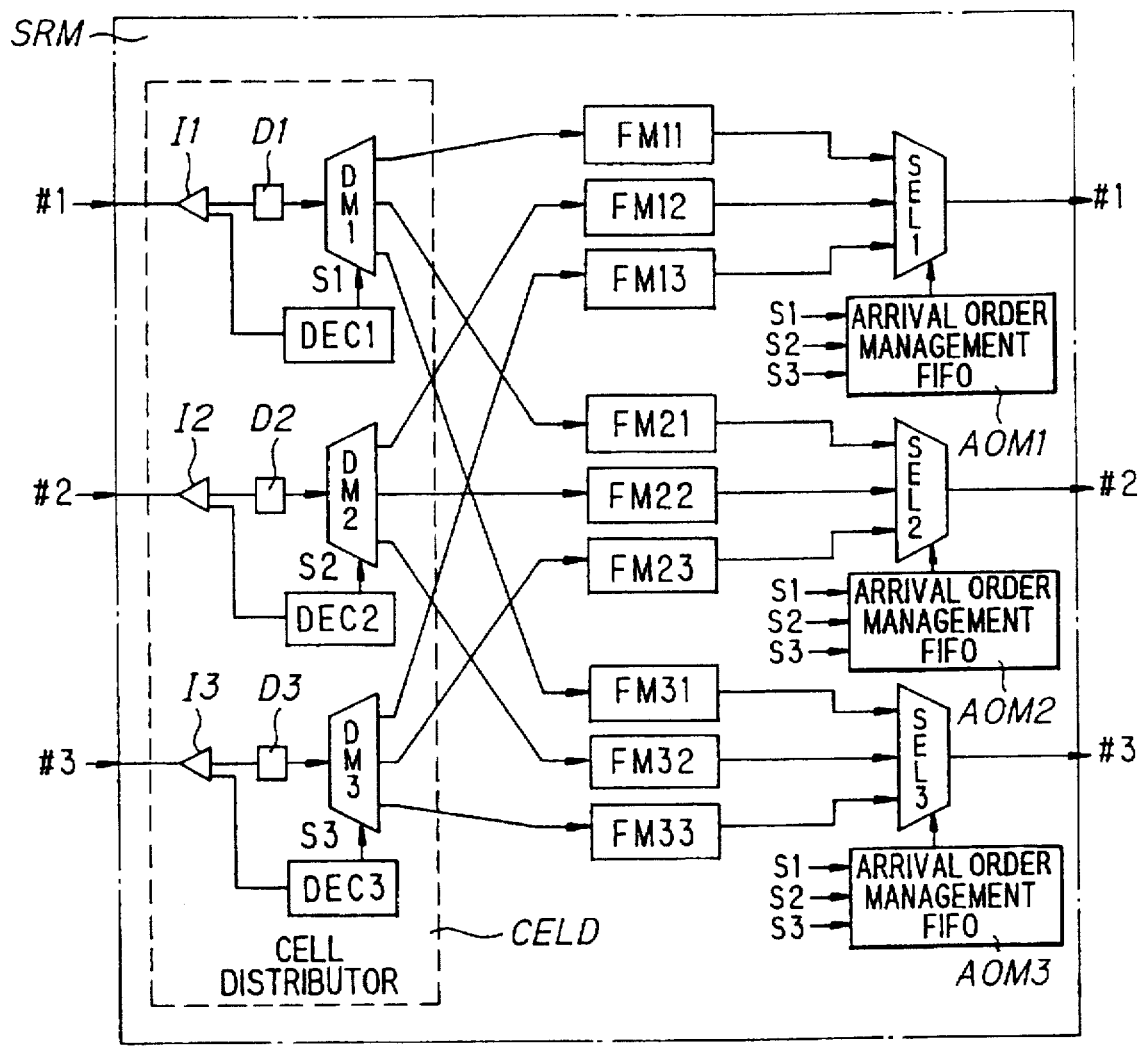
FIG. 13 is a diagram showing the construction of a switching unit.

FIG. 13 is a diagram showing the construction of the switching unit SWU. The switching unit includes routing information detection circuits $I_1$~$I_3$, transmission information delay circuits $D_1$~$D_3$, demultiplexers $DM_1$~$DM_3$, and routing information decoding circuits $DEC_1$~$DEC_3$, which construct a cell distribution unit CELD, buffer memories such as FIFO (first-in, first-out) memories $FM_{11}$~$FM_{33}$, selectors $SEL_1$~$SEL_3$, and arrival order management FIFOs $AOM_1$~$AOM_3$. Each arrival order management FIFO ($AOM_1$~$AOM_3$) is connected to the output terminals of the routing information decoding circuits $DEC_1$~$DEC_3$ and stores the order in which cells arrive at the corresponding three buffer memories $FM_{11}$~$FM_{13}$, $FM_{21}$~$FM_{23}$, $FM_{31}$~$FM_{33}$. These FIFOs control the corresponding selectors $SEL_1$~$SEL_3$ so that cells are read out of the three buffer memories in the order of cell arrival and sent to outgoing lines #1~#3.

The detection circuits $I_i$ (i=1~3) drop the routing information contained in the entered cell and send the information to the decoder circuits $D_i$ (i=1~3). If the entering routing information indicates the output terminal #j (j=1~3), the decoder circuit $DEC_i$ operates the demultiplexer $DM_i$ by a changeover signal $S_i$ to send the cell to the FIFO memory $FM_{ji}$. For example, if the routing information of the cell that has entered from the input terminal #1 indicates output terminal #2, the decoder circuit $DEC_1$ operates the demultiplexer $DM_1$ so that the information from the input terminal #1 enters FIFO $FM_{21}$. The arrival order management FIFO ($AOM_i$) is connected to the output terminals of the routing information decoding circuits $DEC_1$~$DEC_3$ and stores the order in which cells arrive in the corresponding three buffer memories $FM_{i1}$~$FM_{i3}$. For example, if cells arrive in the order of buffer memories $FM_{11}\to FM_{12}\to FM_{13}\to FM_{12}\to$ .. .. buffer memory identification codes are stored in the arrival order management FIFO ($AOM_1$) in the order of cell arrival, i.e., in the manner $1\to 2\to 3\to 2\to$ .... Thereafter, the arrival order management FIFO ($AOM_i$) controls the corresponding selector $SEL_i$ so that cells are read out of the three buffer memories $FMi_1$~$FMi_3$ in the order of cell arrival and sent to the outgoing line #i.

Figure 14:
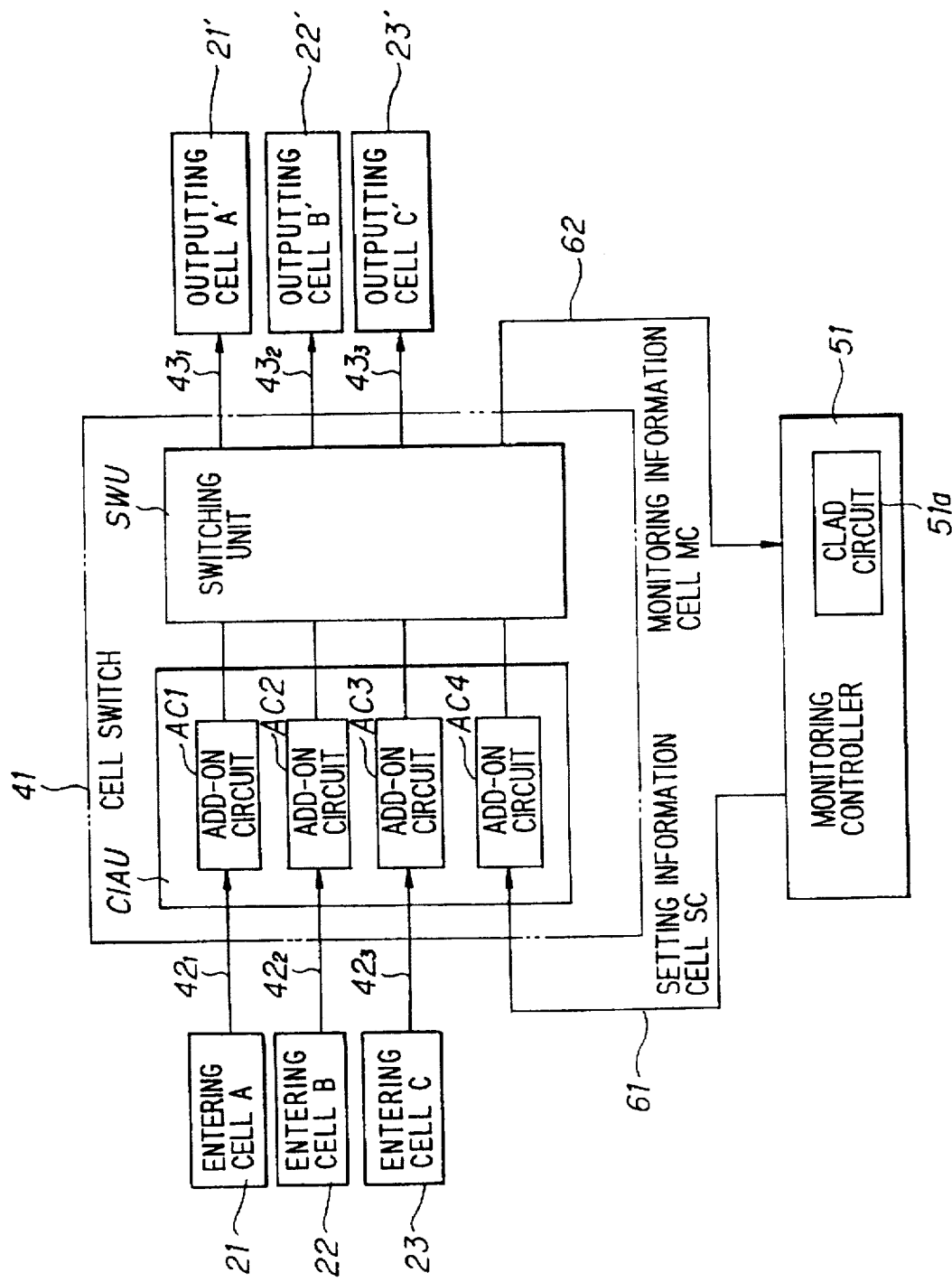
FIG. 14 is a diagram showing the construction of a multiplexing device which uses a cell switch.
Figure 15:
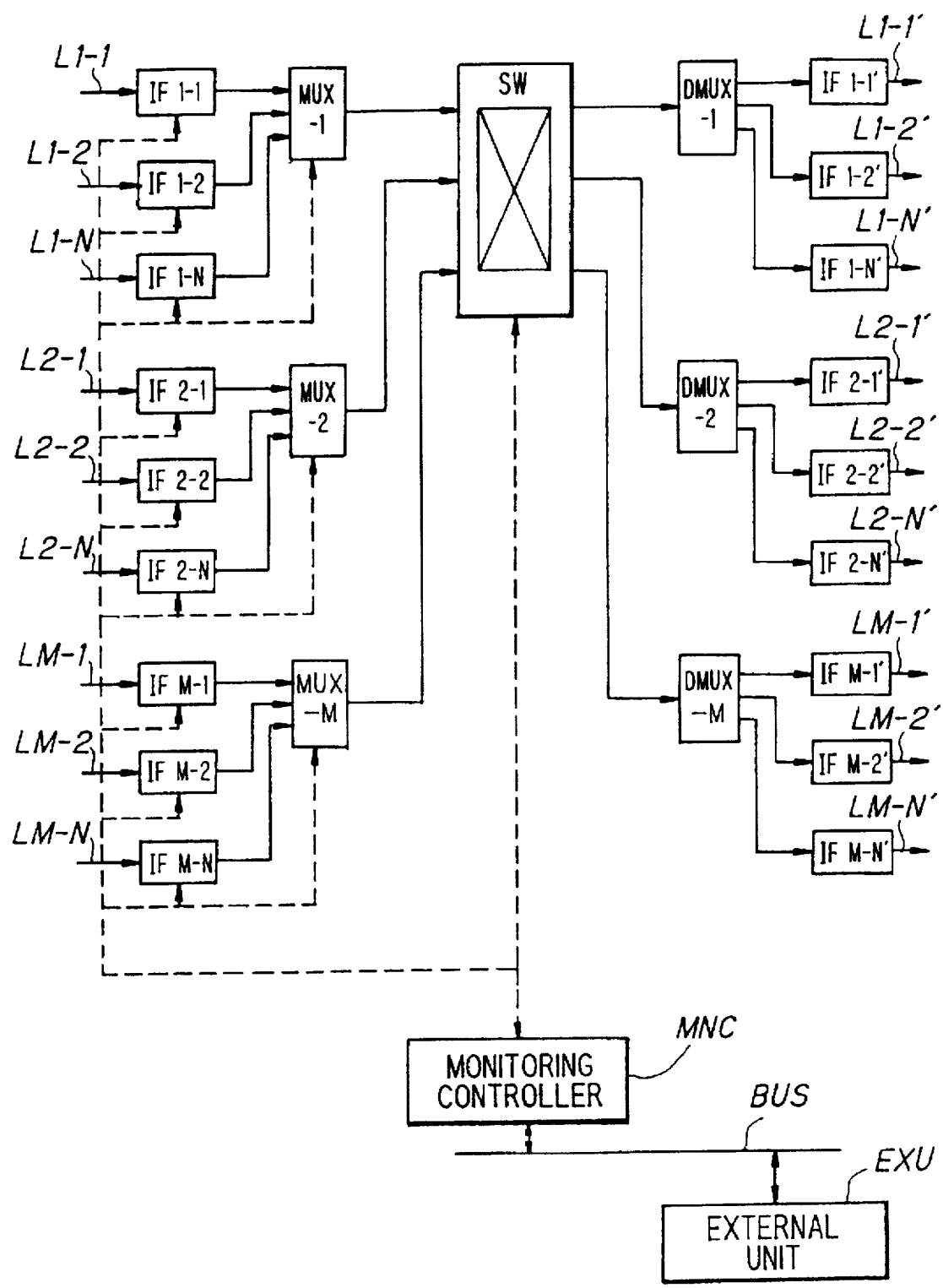
FIG. 15 is a diagram showing the construction of a multiplexing device according to the prior art.
Figure 16:
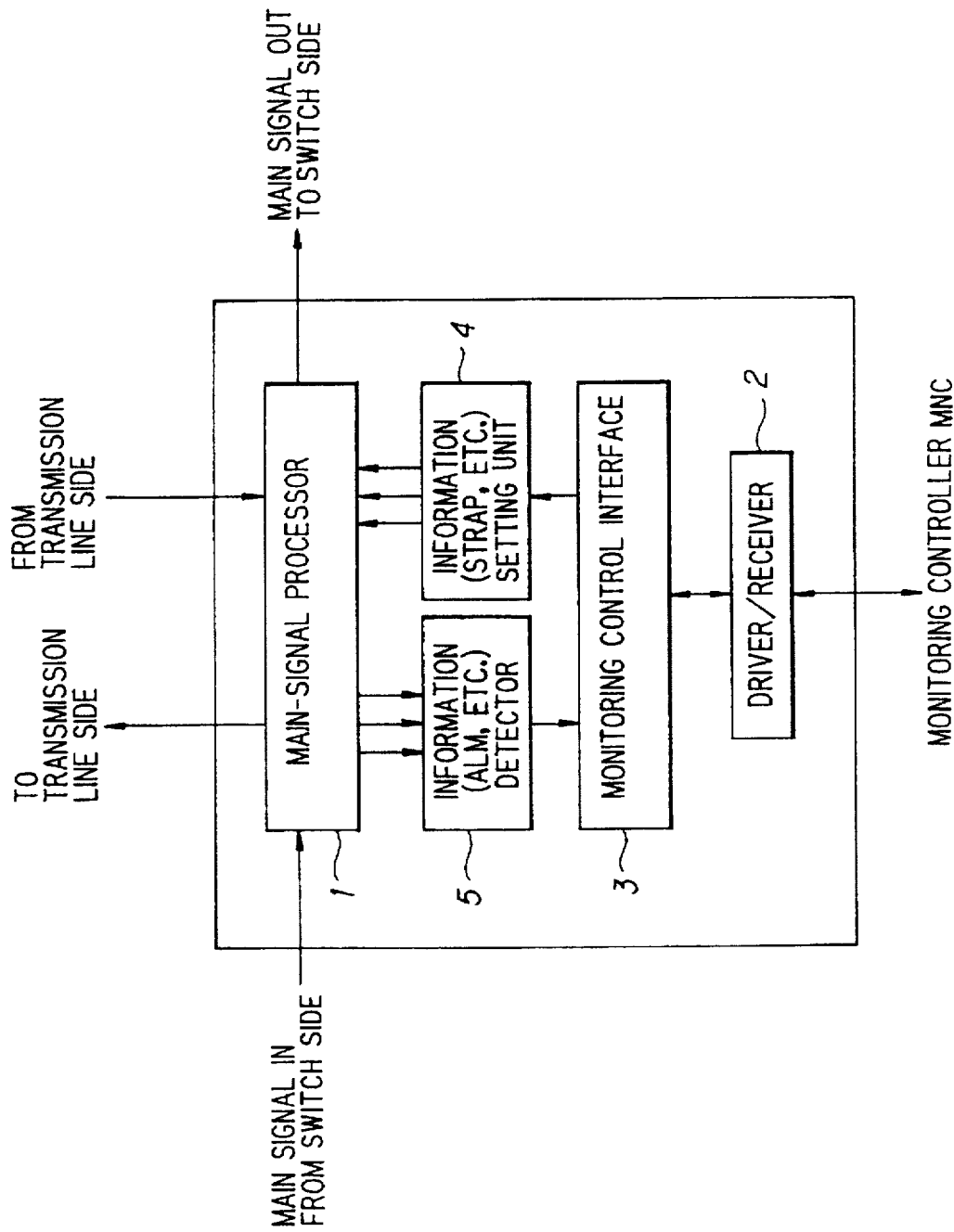
FIG. 16 is a diagram showing the construction of a package according to the prior art.

(e-2) Control for Sending/receiving Setting Information and Monitoring Information (1) Construction FIG. 14 is a diagram showing the construction of a multiplexing device using a cell switch. Numerals 21~23, 21'~23' denote units which construct a multiplexing section, numeral 41 denotes the cell switch, numerals $42_1$~$42_3$ denote incoming lines for entering cells A, B, C from the units 21~23 into the cell switch 41, and numerals $43_1$~$43_3$ denote outgoing lines for outputting cells A', B', C' from the cell switch 41 to the units 21'~23'. Also shown are the monitoring controller 51, a CLAD circuit 51a for cell assembly/disassembly, the incoming line 61 for entering a setting information cell SC from the monitoring controller 51 to the cell switch 41, and the outgoing line 62 for outputting a monitoring information cell MC to the monitoring controller 51. The units 21, 21' are included in the same package, as are the units 22, 22' and the units 23, 23'. The monitoring controller 51 sends the setting information cell SC package by package and acquires the monitoring information cell MC package by package.

(2) Operation

The value of the VPI/VCI added onto the header of a setting information cell SC destined for each package is determined in advance, package by package, from the monitoring controller 51. In addition, the value of the VPI/VCI added onto the header of a monitoring information cell MC destined for the monitoring controller 51 is determined in advance from each package. Further, the routing table of the add-on circuit ACi is created beforehand so as to satisfy the two conditions mentioned below. Specifically, the routing table is created in such a manner that ① a cell destined for a prescribed package from the monitoring controller 51 will be routed to the outgoing line that corresponds to the package, and ② a cell destined for the monitoring controller 51 from each package will be routed to the outgoing line 62 that corresponds to the monitoring controller.

If setting information is sent to the first package (units 21, 21'), the monitoring controller 51 forms the setting information into a cell, adds on the VPI/VCI that corresponds to the first package and then enters the cell into the cell switch 41 from the incoming line 61. The add-on circuit AC4 of cell switch 41 refers to the routing table, adds the routing information corresponding to the VPI/VCI of the input cell onto the cell, replaces the VPI/VCI and then enters the cell into the switching unit SWU. On the basis of the routing information, the switching unit SWU sends the input cell to the outgoing line $43_1$ that corresponds to the first package. The setting information cell outputted to the outgoing line $43_1$ enters the first package (21, 21') shown in FIG. 4. The cell dropper 82 of each package drops the setting information cell from the cell stream and enters the cell into the monitoring control interface 83. The CLAD circuit 83a of the monitoring control interface 83 disassembles the entered setting information cell and enters the result into the information setting unit 84. As a result, the information setting unit 84 sets the setting information into the main-signal processor 81. It should be noted that the monitoring controller 51 performs an operation similar to the foregoing also in a case where setting information is sent to another package.

If the monitoring information from the first package (21, 21') is sent to the monitoring controller 51, the CLAD circuit 83a of the monitoring control interface 83 assembles the monitoring information into a cell and adds on the VPI/VCI that corresponds to the monitoring controller, thereby creating the monitoring information cell MC. The cell insertion unit 86 inserts the monitoring information cell into the cell stream and enters the same into the cell switch 41 from the incoming line $42_1$. The add-on circuit AC1 of the cell switch 41 refers to the routing table, adds the routing information corresponding to VPI/VCI of the monitoring information cell onto the cell, replaces the VPI/VCI and enters the cell into the switching unit SWU. Based upon the routing information, the switching unit SWU sends the monitoring information cell to the outgoing line 62 corresponding to the monitoring controller 51. The monitoring controller 51 accepts the monitoring information cell from the outgoing line 62, disassembles the cell and performs predetermined monitoring control. It should be noted that the monitoring controller 51 performs an operation similar to the foregoing also in a case where monitoring information is sent to another package.

In the foregoing, a case is described in which the present invention is applied to a multiplexing device. However, the invention is applicable also to a communication apparatus having an arrangement similar to that of the multiplexing device, e.g., to an exchange.

(f) Effects

In accordance with the present invention, a monitoring controller and the input side of a time switch are connected by an incoming line, and the monitoring controller is connected to the output side of the time switch by an outgoing line. In a case where setting information is transferred from the monitoring controller to a unit, the monitoring controller time-division multiplexes the setting information for the unit to a prescribed time slot and enters the information into the time switch via the incoming line. The time switch switches the time slot position of the setting information and sends the setting information to the outgoing line corresponding to the unit. The unit drops the setting information from the time slot. Further, in a case where monitoring information is transferred from a unit to the monitoring controller, the unit time-division multiplexes the monitoring information to a predetermined time slot and enters the information into the time switch from a prescribed line. The time switch switches the time slot position of the monitoring information and sends the monitoring information to the monitoring controller via the above-mentioned outgoing line. The monitoring controller accepts the monitoring information from the above-mentioned unit, with the information coming from the above-mentioned time slot. If this arrangement according to the present invention is adopted, the monitoring controller need not be connected to individual packages by separate monitoring control buses. As a result, a driver/receiver need not be provided for each package, thus making it possible to reduce circuit size. Moreover, it is possible to reduce power consumption. Furthermore, the problem of insufficient space for pins is eliminated because the number of connector pins can be reduced. Since a high-speed main-signal bus can be utilized, it is possible to send and receive, at high speed, a large quantity of alarm information and setting information.

In accordance with the present invention, a monitoring controller and the input side of a space switch are connected by an incoming line, and the monitoring controller is connected to the output side of the space switch by an outgoing line. In a case where setting information is transferred from the monitoring controller to a prescribed unit, the monitoring controller time-division multiplexes the setting information to a prescribed time slot corresponding to the unit and inputs the setting information to the space switch via the incoming line. The space switch sends the setting information of the above-mentioned time slot by switching it to an outgoing line corresponding to the unit, and the unit drops the setting information from this time slot. Further, in a case where monitoring information is transferred from a unit to the monitoring controller, the unit time-division multiplexes the monitoring information to the time slot corresponding to this unit and enters the monitoring information into the space switch. The space switch sends the monitoring information of this time slot to the monitoring controller upon switching the monitoring information to the above-mentioned outgoing line. The monitoring controller accepts the monitoring information from the above-mentioned unit, this information coming from the above-mentioned time slot. If this arrangement according to the present invention is adopted, the monitoring controller need not be connected to individual packages by separate monitoring control buses. As a result, a driver/receiver need not be provided for each package, thus making it possible to reduce circuit size. Moreover, it is possible to reduce power consumption. Furthermore, the problem of insufficient space for pins is eliminated because the number of connector pins can be reduced. Since a high-speed main-signal bus can be utilized, it is possible to send and receive, at high speed, a large quantity of alarm information and setting information.

In accordance with the present invention, a monitoring controller and the input side of a cell switch are connected by an incoming line, and the monitoring controller is connected to the output side of the cell switch by an outgoing line. In a case where setting information is transferred from the monitoring controller to a prescribed unit, the monitoring controller assembles the setting information into a cell and enters the cell into the cell switch via the incoming line. On the basis of header information contained in the cell, the cell switch sends the cell to an outgoing line corresponding to the above-mentioned unit, and the unit disassembles the cell and drops the setting information. Further, in a case where monitoring information is transferred from a unit to the monitoring controller, the unit assembles the monitoring information into a cell and enters the cell into the cell switch. On the basis of header information contained in the cell, the cell switch sends the cell to the above-mentioned outgoing line. The monitoring controller disassembles the cell and accepts the monitoring information from the above-mentioned unit. If this arrangement according to the present invention is adopted, the monitoring controller need not be connected to individual packages by separate monitoring control buses. As a result, a driver/receiver need not be provided for each package, thus making it possible to reduce circuit size. Moreover, it is possible to reduce power consumption. Furthermore, the problem of insufficient space for pins is eliminated because the number of connector pins can be reduced. Since a high-speed main-signal bus can be utilized, it is possible to send and receive, at high speed, a large quantity of alarm information and setting information.

As many apparently widely different embodiments of the present invention can be made without departing from the spirit and scope thereof, it is to be understood that the invention is not limited to the specific embodiments thereof except as defined in the appended claims.

What is claimed is:

1. A method of sending and receiving information in a communication apparatus including a multiplexing section having a switch for sending data, which have entered from a prescribed incoming line, to a prescribed outgoing line, and a plurality of units connected to the switch via incoming and outgoing lines, and a monitoring controller for sending setting information specifying operation of the units to the units of the multiplexing section and receiving monitoring information from each unit, said method comprising the steps of:

connecting an output side of said monitoring controller and an input side of said switch by an incoming line and connecting an input side of said monitoring controller and an output side of said switch by an outgoing line;

sending the setting information from said monitoring controller to a prescribed unit via the incoming line and said switch; and sending the monitoring information from a unit to said monitoring controller via said switch and the outgoing line.

2. A method of sending and receiving information in a communication apparatus including a multiplexing section having a time switch for sending time-division multiplexed data, which have entered from a plurality of incoming lines, to prescribed outgoing lines upon switching time slot positions of the time-division multiplexed data, and a plurality of units connected to the time switch via incoming and outgoing lines, and a monitoring controller for sending information specifying operation of the units to the units constructing the multiplexing section and setting the information in these units, and for receiving monitoring information from the units, said method comprising the steps of:

connecting an output side of said monitoring controller and an input side of said time switch by an incoming line and connecting an input side of said monitoring controller and an output side of said time switch by an outgoing line;

in a case where setting information is transferred from said monitoring controller to a unit, causing said monitoring controller to time-division multiplex the setting information to a time slot corresponding to said unit and enter the setting information into said time switch via said incoming line;

causing said time switch to change the time slot position of the setting information to a specific time slot position and then send the setting information to an outgoing line corresponding to said unit;

causing the unit to drop the setting information from said specific time slot position;

in a case where monitoring information is transferred from a unit to said monitoring controller, causing said unit to time-division multiplex the monitoring information to a predetermined time slot and enter the monitoring information into said time switch from an incoming line corresponding to the unit;

causing said time switch to change the time slot position of the monitoring information to a time slot position corresponding to said unit and then send the monitoring information to said monitoring controller via an outgoing line corresponding to said monitoring controller; and causing said monitoring controller to accept the monitoring information from said time slot position, this monitoring information being obtained from said unit.

3. A method of sending and receiving information in a communication apparatus including a multiplexing section having a space switch for sending time-division multiplexed data, which have entered from a plurality of incoming lines, to prescribed outgoing lines upon switching the data on the prescribed outgoing lines, and a plurality of units connected to the space switch via incoming and outgoing lines, and a monitoring controller for sending information specifying operation of each unit to the units constructing the multiplexing section and setting the information in these units, and for receiving monitoring information from each unit, said method comprising the steps of:

connecting an output side of said monitoring controller and an input side of said space switch by an incoming line and connecting an input side of said monitoring controller and an output side of said space switch by an outgoing line;

in a case where setting information is transferred from said monitoring controller to a prescribed unit, causing said monitoring controller to time-division multiplex the setting information to a prescribed time slot corresponding to the unit and then enter the setting information into said space switch via said incoming line;

causing said space switch to send the setting information of said time slot to an outgoing line corresponding to said unit upon switching the setting information to this outgoing line;

causing the unit to drop the setting information from said time slot;

in a case where monitoring information is transferred from a unit to said monitoring controller, causing said unit to time-division multiplex the monitoring information to a time slot corresponding to said unit and then enter the monitoring information into said space switch;

causing said space switch to send the monitoring information of said time slot to said monitoring controller upon switching the monitoring information to an outgoing line corresponding to said monitoring controller; and causing the monitoring controller to accept the monitoring information from said time slot, this monitoring information being obtained from said unit.

4. A method of sending and receiving information in a communication apparatus including a multiplexing section having a cell switch for switching cells, which have entered from a plurality of incoming lines, to prescribed lines upon referring to header information contained in the cells, and a plurality of units connected to the cell switch via incoming and outgoing lines, and a monitoring controller for sending information specifying operation of the units to the units constructing the multiplexing section and setting the information in these units, and for receiving monitoring information from each unit, said method comprising the steps of:

connecting an output side of said monitoring controller and an input side of said cell switch by an incoming line and connecting an input side of said monitoring controller and an output side of said cell switch by an outgoing line;

in a case where setting information is transferred from said monitoring controller to a prescribed unit, causing said monitoring controller to assemble the setting information into a cell and entering the cell into said cell switch via said incoming line;

causing said cell switch to send the cell to an outgoing line corresponding to said unit based upon the header information contained in said cell;

causing the unit to disassemble the cell and drop the setting information;

in a case where monitoring information is transferred from a unit to said monitoring controller, causing the unit to assemble the monitoring information into a cell and enter the cells into said cell switch;

causing said cell switch to send the cell to said outgoing line corresponding to said monitoring controller based upon the header information contained in said cell; and causing said monitoring controller to disassemble said cell and accept the monitoring information from said unit.

5. The method according to claim 4, wherein said monitoring controller assembles the setting information into a cell and adds a VPI/VCI, which corresponds to a unit to which the setting information is to be sent, onto the cell as header information;

a unit assembles the monitoring information into a cell and adds a VPI/VCI, which corresponds to said monitoring controller, onto the cell as header information; and said cell switch switches cells, based upon VPI/VCI, and sends cells to a unit or to said monitoring controller as prescribed.

* * * * *

UNITED STATES PATENT AND TRADEMARK OFFICE
CERTIFICATE OF CORRECTION

PATENT NO. : 5,715,247
DATED : FEBRUARY 3, 1998
INVENTOR(S) : Hirochi NARA, et al.

It is certified that error appears in the above-identified patent and that said Letters Patent is hereby corrected as shown below:

On the title page, item [73], please delete "NEC Corporation, Tokyo, Japan" and insert -- FUJITSU LIMITED, Kanagawa, Japan--

Signed and Sealed this

Seventh Day of September, 1999

Attest:

Q. TODD DICKINSON

Attesting Officer

Acting Commissioner of Patents and Trademarks